(12) United States Patent
Jung et al.

(10) Patent No.: US 10,555,259 B2
(45) Date of Patent: *Feb. 4, 2020

(54) METHOD PERFORMED BY A TERMINAL FOR PERFORMING A COMMUNICATION OPERATION OF ANOTHER TERMINAL IN A WIRELESS COMMUNICATION SYSTEM AND TERMINAL USING METHOD

(71) Applicant: LG ELECTRONICS INC., Seoul (KR)

(72) Inventors: Sunghoon Jung, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 27 days.

This patent is subject to a terminal disclaimer.

(21) Appl. No.: 15/558,517

(22) PCT Filed: Mar. 24, 2016

(86) PCT No.: PCT/KR2016/003005
§ 371 (c)(1),
(2) Date: Sep. 14, 2017

(87) PCT Pub. No.: WO2016/153295
PCT Pub. Date: Sep. 29, 2016

(65) Prior Publication Data
US 2018/0084497 A1 Mar. 22, 2018

Related U.S. Application Data

(60) Provisional application No. 62/137,238, filed on Mar. 24, 2015.

(51) Int. Cl.
*H04W 52/02* (2009.01)
*H04W 72/04* (2009.01)
(Continued)

(52) U.S. Cl.
CPC ... *H04W 52/0225* (2013.01); *H04W 52/0261* (2013.01); *H04W 72/0406* (2013.01);
(Continued)

(58) Field of Classification Search
CPC ......... H04W 52/0209; H04W 52/0219; H04W 52/0225; Y02D 70/26
See application file for complete search history.

(56) References Cited

U.S. PATENT DOCUMENTS

2007/0189256 A1 8/2007 Oh
2009/0221261 A1 9/2009 Soliman
(Continued)

FOREIGN PATENT DOCUMENTS

| KR | 10-2013-0009847 A | 1/2013 |
| KR | 10-2014-0030338 A | 3/2014 |
| WO | WO 2012/134099 A2 | 10/2012 |

OTHER PUBLICATIONS

3GPP TS 36.304 V8.5.0 (Mar. 2009), 3rd Generation Partnership Project; Technical Specification Group Radio Access Network; Evolved Universal Terrestrial Radio Access (E-UTRA); User Equipment (UE) procedures in idle mode (Release 8), pp. 1-30.

*Primary Examiner* — Robert C Scheibel
(74) *Attorney, Agent, or Firm* — Birch, Stewart, Kolasch & Birch, LLP

(57) ABSTRACT

Provided are a communication method performed by a terminal in a wireless communication system, and a terminal using the method. The method comprises: determining to act as a proxy for signal transmission and reception for another terminal; and acting as a proxy for transmission and reception of a signal for the other terminal. The terminal acts as a proxy for signal transmission and reception for another terminal sensitive to a battery capacity, thereby enabling the other terminal to operate in a power-saving mode.

16 Claims, 23 Drawing Sheets

(51) Int. Cl.
*H04W 88/04* (2009.01)
*H04W 92/18* (2009.01)
*H04W 76/27* (2018.01)

(52) U.S. Cl.
CPC .......... *H04W 76/27* (2018.02); *H04W 88/04* (2013.01); *H04W 92/18* (2013.01)

(56) References Cited

U.S. PATENT DOCUMENTS

| | | | | |
|---|---|---|---|---|
| 2011/0255444 | A1* | 10/2011 | Soliman | H04L 41/12 370/255 |
| 2012/0214494 | A1* | 8/2012 | Awoniyi | H04W 88/10 455/439 |
| 2013/0024706 | A1* | 1/2013 | Katar | H04L 12/12 713/321 |
| 2013/0230015 | A1* | 9/2013 | Hoymann | H04L 5/0053 370/329 |
| 2014/0169261 | A1* | 6/2014 | Ming | H04W 88/04 370/315 |
| 2014/0321355 | A1* | 10/2014 | Choi | H04B 7/15507 370/315 |
| 2015/0172387 | A1* | 6/2015 | Ge | H04W 4/70 370/254 |
| 2016/0142974 | A1* | 5/2016 | Lindoff | H04W 56/00 370/311 |
| 2016/0360563 | A1* | 12/2016 | Lecroart | H04L 69/322 |
| 2017/0019833 | A1* | 1/2017 | Luo | H04W 40/24 |
| 2017/0302360 | A1* | 10/2017 | Aminaka | H04W 80/02 |
| 2017/0359766 | A1* | 12/2017 | Agiwal | H04W 76/14 |
| 2018/0041605 | A1* | 2/2018 | Zhang | H04W 4/70 |
| 2018/0077624 | A1* | 3/2018 | Jung | H04W 36/03 |

* cited by examiner

METHOD PERFORMED BY A TERMINAL FOR PERFORMING A COMMUNICATION OPERATION OF ANOTHER TERMINAL IN A WIRELESS COMMUNICATION SYSTEM AND TERMINAL USING METHOD

CROSS REFERENCE TO RELATED APPLICATIONS

This application is the National Phase of PCT International Application No. PCT/KR2016/003005, filed on Mar. 24, 2016, which claims priority under 35 U.S.C. 119(e) to U.S. Provisional Application No. 62/137,238, filed on Mar. 24, 2015, all of which are hereby expressly incorporated by reference into the present application.

BACKGROUND OF THE INVENTION

Field of the Invention

The present invention relates to wireless communications, and more particularly, relates to a communication method performed by a terminal in a wireless communication system and a terminal using the same.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, $3^{rd}$ Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

Recently, owing to the development of the information communication industry, a user may have a variety of terminals simultaneously. For example, the case is increasing that a user has a smart phone and a smart watch, a user has a smart phone and a tablet PC, or a user has a smart watch and a tablet PC.

In the case that all of the terminals possessed by a user perform the procedure for each of the conventional cellular operations, an operation time of a terminal of which battery capacity is relatively small is shorter than an operation time of a terminal of which battery capacity is relatively great. For example, in the case that a user has both of a smart phone and a smart watch, and both of the smart phone and the smart watch perform the cellular operation, a battery of the smart watch of which battery capacity is smaller than that of the smart phone is discharged fast, and accordingly, the function of the smart watch is not fully fulfilled.

Accordingly, a method and apparatus is required to solve the problem described above.

SUMMARY OF THE INVENTION

An object of the present invention is to provide a communication method performed by a terminal in a wireless communication system and a terminal using the same.

In one aspect, provided is a communication method performed by a user equipment (UE) in a wireless communication system, comprising: determining to work for a signal transmission and reception of other UE and working for the signal transmission and reception of other UE.

The UE may monitor control information and data that a network transmits to the other UE.

The control information that the network transmits to the other UE may be identified by an identifier of the other UE.

The control information that the network transmits to the other UE may be monitored in a search space indicated by the identifier of the other UE.

The control information that the network transmits to the other UE may be identified by an identifier of the UE.

The control information that the network transmits to the other UE may include a field representing that the control information is with respect to the other UE.

When the UE receives the data that the network transmits to the other UE, the UE may forward the data to the other UE.

The data may be either one of a higher layer message transmitted through a signaling radio bearer (SRB) or a user data transmitted through a data radio bearer (DRB).

The UE may provide information representing a type either one of a higher layer message transmitted through the SRB or the user data transmitted through the DRB.

The UE may transmit an uplink data of the other UE using an uplink resource that the network allocates to the other UE.

The UE may request the uplink resource of the other UE, and transmits the uplink data of the other UE using the uplink resource allocated from the network by the request.

When the UE determines to work for the signal transmission and reception for the other UE, the other UE may operate in a power saving mode.

The other UE in the power saving mode may performs one of: not performing a measurement of a serving cell and a neighboring cell which is required for performing a procedure in relation to mobility, performing a measurement of a serving cell and a neighboring cell which is required for performing a procedure in relation to mobility with a lower frequency than the UE, omitting a paging reception, or performing a paging reception with a lower frequency than the UE.

A battery capacity of the UE is greater than that of the other UE.

The UE may receive configuration information of the other UE from the other UE, and works for the signal transmission and reception of the other UE.

In another aspect, provided is a user equipment (UE). The UE includes a radio frequency (RF) unit configured to transmit or receive a radio signal and a processor operatively connected to the RF unit. The processor is configured to perform: determining to work for a signal transmission and reception of other UE and working for the signal transmission and reception of other UE.

According to the present invention, a second terminal of which battery capacity is great may perform a signal transmission and reception for a first terminal in place of the first terminal of which battery capacity is small. Accordingly, the first terminal may save the power consumption in comparison with a normal mode, and the battery efficiency of the first terminal increases.

DESCRIPTION OF EXEMPLARY EMBODIMENTS

Figure 1:
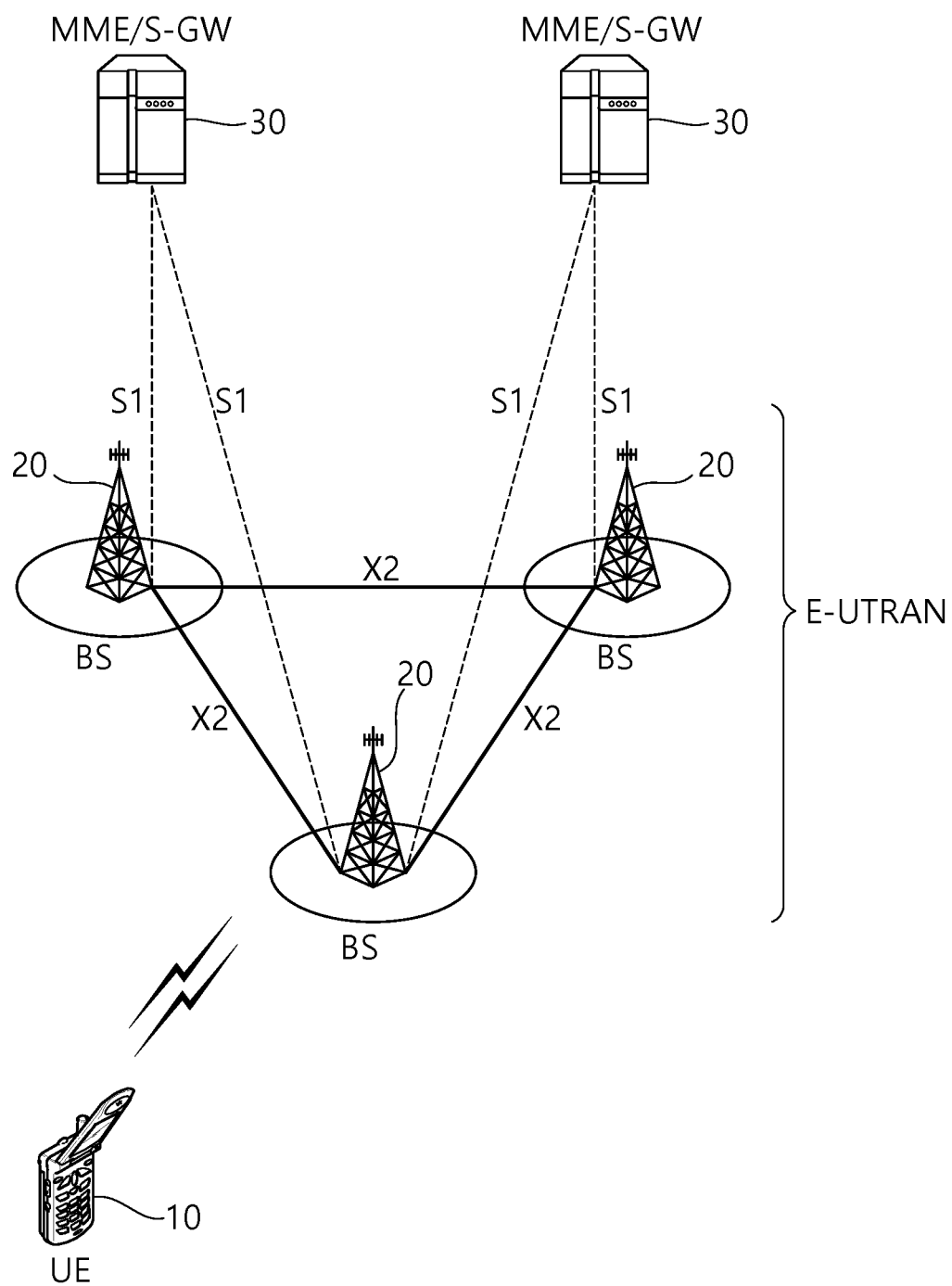
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
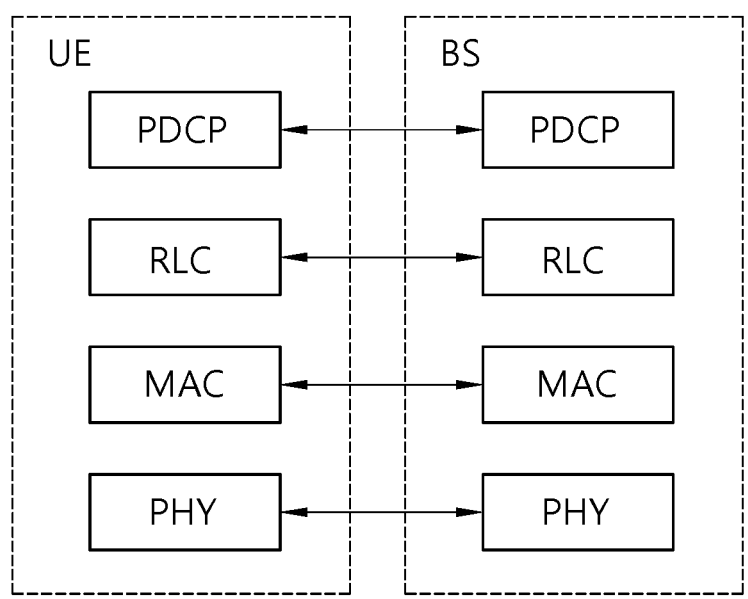
FIG. 2 is a diagram showing a wireless protocol architecture for a user plane.
Figure 3:
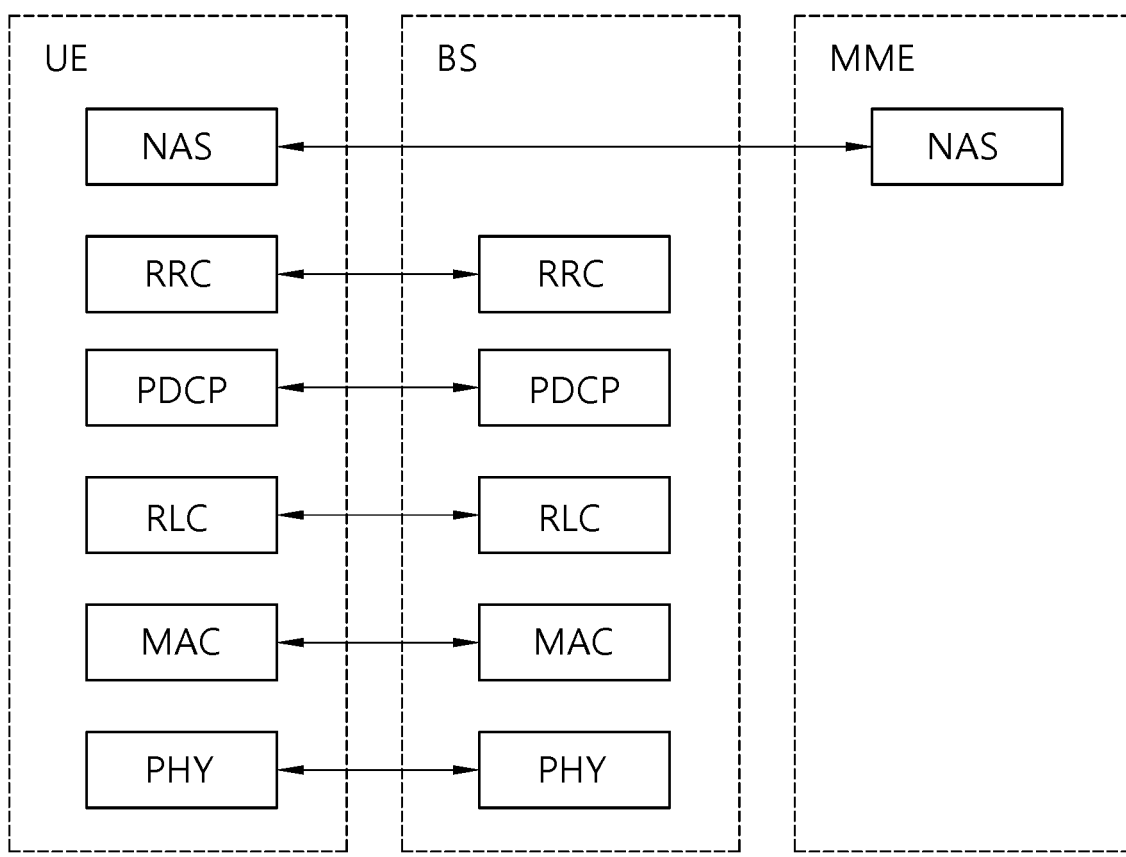
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include the limited number of parameters which are the most essential and are most frequently transmitted in order to obtain other information from a cell. UE first discovers an MIB after downlink synchronization. The MIB may include information, such as a downlink channel bandwidth, a PHICH configuration, an SFN supporting synchronization and operating as a timing reference, and an eNB transmission antenna configuration. The MIB may be broadcasted on a BCH.

SystemInformationBlockType1 (SIB1) of included SIBs is included in a "SystemInformationBlockType1" message and transmitted. Other SIBs other than the SIB1 are included in a system information message and transmitted. The mapping of the SIBs to the system information message may be flexibly configured by a scheduling information list parameter included in the SIB1. In this case, each SIB is included in a single system information message. Only SIBs having the same scheduling required value (e.g. period) may be mapped to the same system information message. Furthermore, SystemInformationBlockType2 (SIB2) is always mapped to a system information message corresponding to the first entry within the system information message list of a scheduling information list. A plurality of system information messages may be transmitted within the same period. The SIB1 and all of the system information messages are transmitted on a DL-SCH.

In addition to broadcast transmission, in the E-UTRAN, the SIB1 may be channel-dedicated signaling including a parameter set to have the same value as an existing set value. In this case, the SIB1 may be included in an RRC connection re-establishment message and transmitted.

The SIB1 includes information related to UE cell access and defines the scheduling of other SIBs. The SIB1 may include information related to the PLMN identifiers, Tracking Area Code (TAC), and cell ID of a network, a cell barring state indicative of whether a cell is a cell on which UE can camp, a required minimum reception level within a cell which is used as a cell reselection reference, and the transmission time and period of other SIBs.

The SIB2 may include radio resource configuration information common to all types of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and for detecting a change of system information to only a PCell. In an SCell, when the corresponding SCell is added, the E-UTRAN may provide all types of system information related to an RRC connection state operation through dedicated signaling. When system information related to a configured SCell is changed, the E-UTRAN may release a considered SCell and add the considered SCell later. This may be performed along with a single RRC connection re-establishment message. The E-UTRAN may set a value broadcast within a considered SCell and other parameter value through dedicated signaling.

UE needs to guarantee the validity of a specific type of system information. Such system information is called required system information. The required system information may be defined as follows.

If UE is in the RRC_IDLE state: the UE needs to have the valid version of the MIB and the SIB1 in addition to the SIB2 to SIB8. This may comply with the support of a considered RAT.

If UE is in the RRC connection state: the UE needs to have the valid version of the MIB, SIB1, and SIB2.

In general, the validity of system information may be guaranteed up to a maximum of 3 hours after being obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
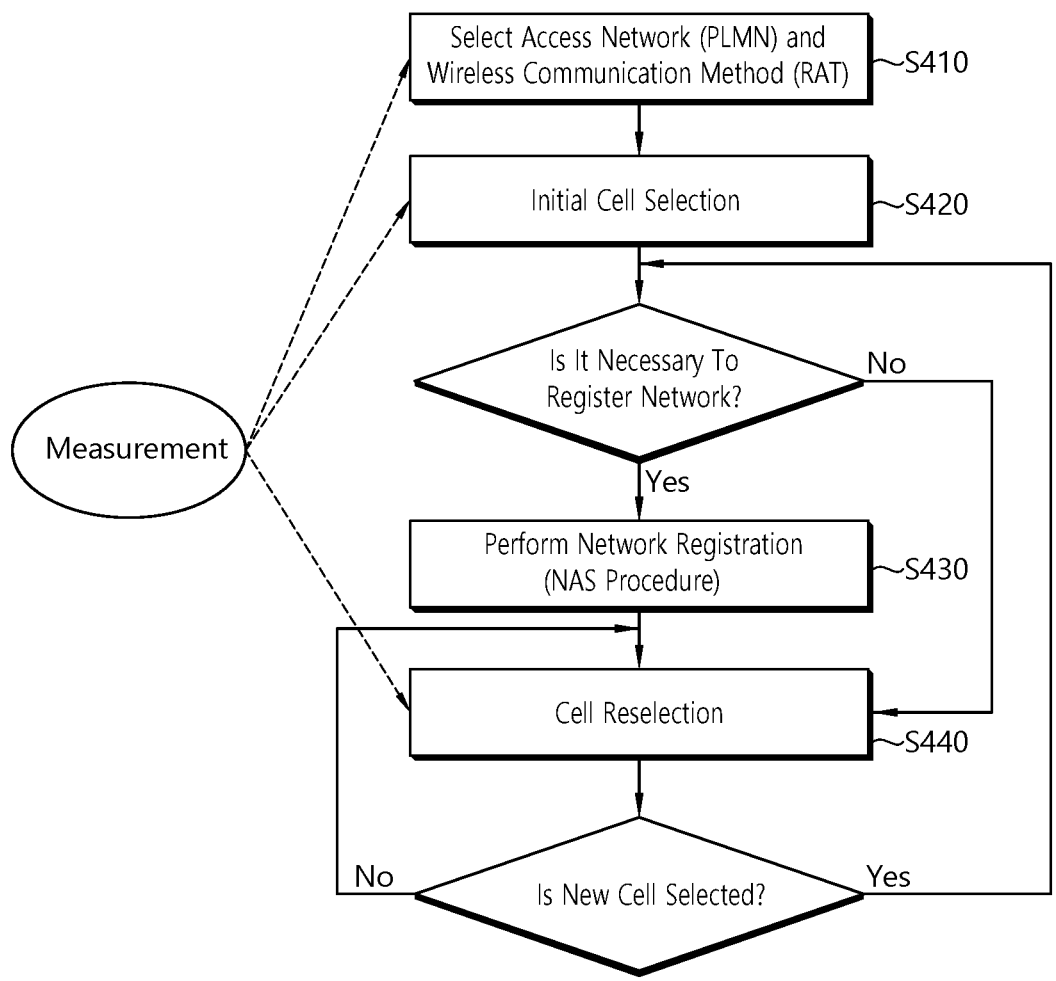
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
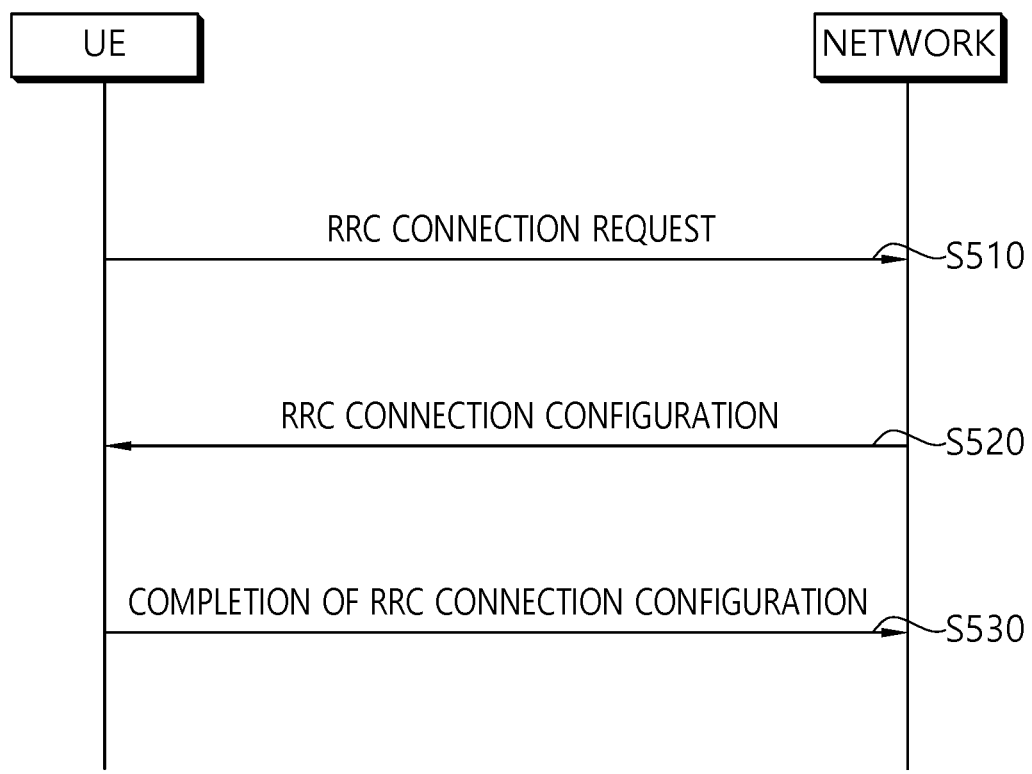
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
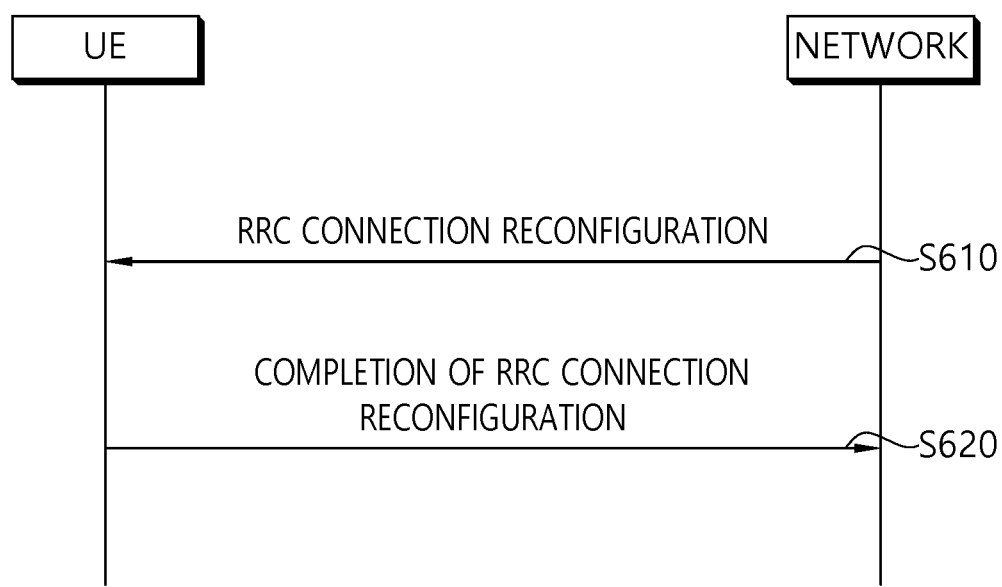
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC).

Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

The cell selection criterion may be defined as below equation 1.

$$Srxlev>0 \text{ AND } Squal>0 \qquad \text{[Equation 1]}$$

where:

$Srxlev = Q_{rxlevmeas} - (Q_{rxlevmin} + Q_{rxlevminoffset}) - Pcompensation$ $Squal = Q_{qualmeas} - (Q_{qualmin} + Q_{qualminoffset})$ Here, the variables in the equation 1 may be defined as below table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signalled values, i.e., $Q_{rxlevminoffset}$ and $Q_{qualminoffset}$, may be applied to a case where cell selection is evaluated as a result of periodic search for a higher priority PLMN during a UE camps on a normal cell in a VPLMN. During the periodic search for the higher priority PLMN as described above, the UE may perform the cell selection evaluation by using parameter values stored in other cells of the higher priority PLMN.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$Rs = Q\text{meas},s + Q\text{hyst}, \quad Rn = Q\text{meas},s - Q\text{offset} \qquad \text{[Equation 2]}$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
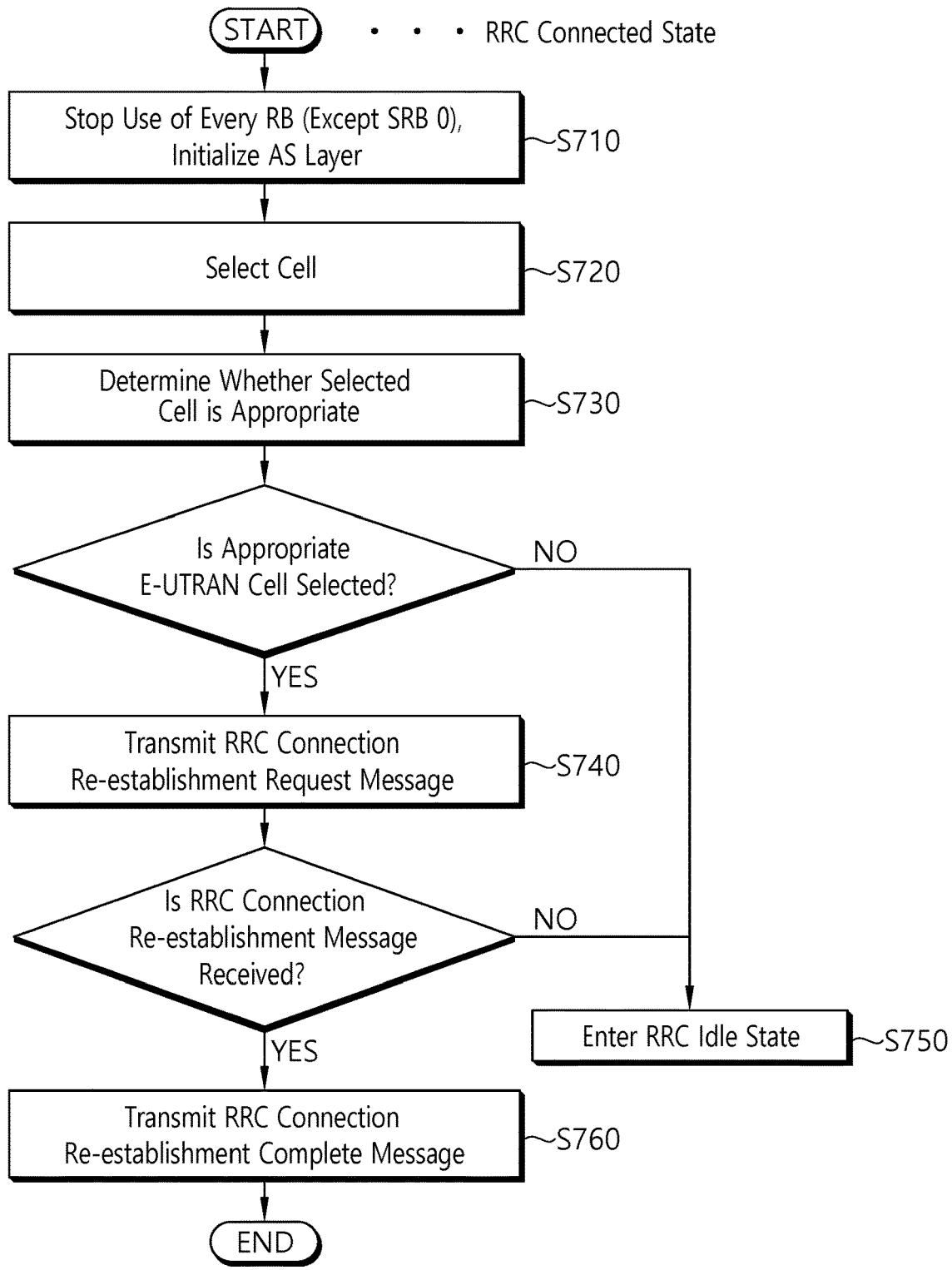
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
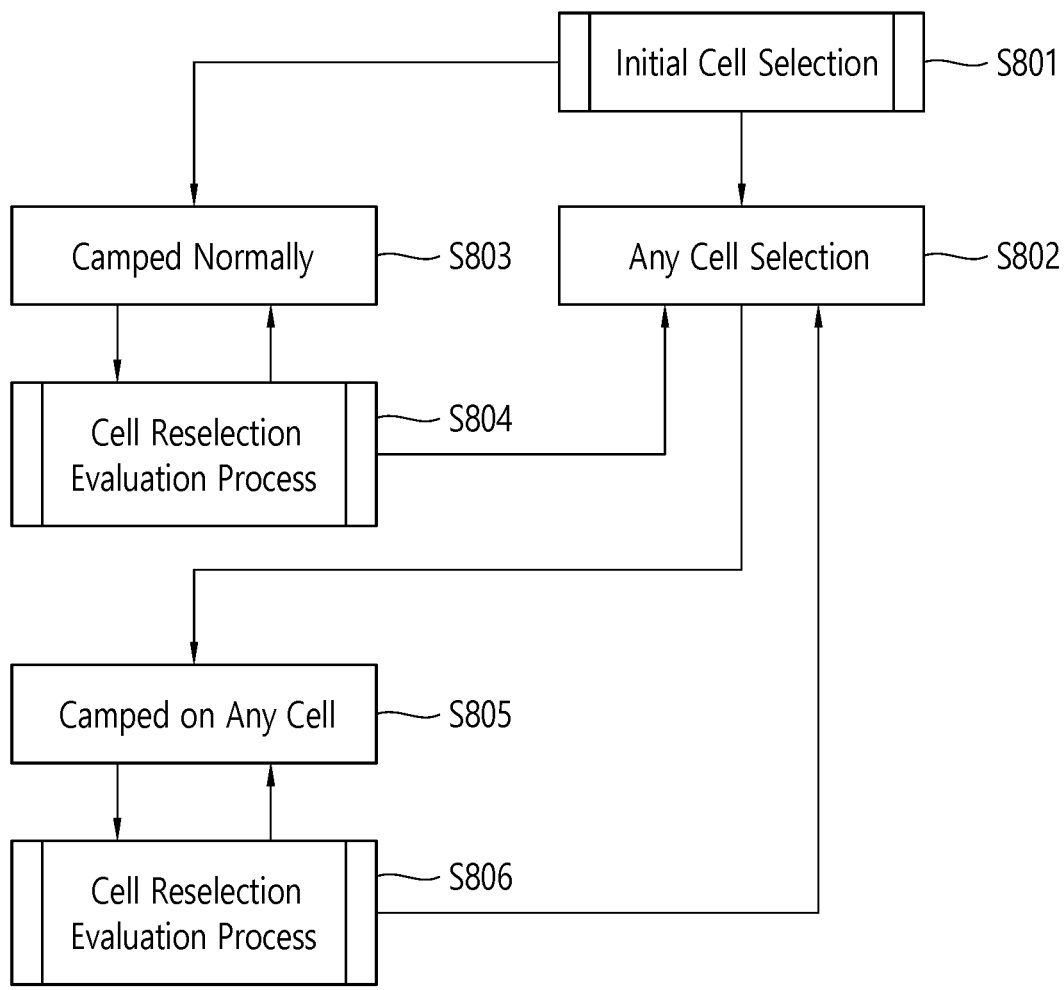
FIG. 8 illustrates substates which may be owned by UE in the RRC_IDLE state and a substate transition process.

FIG. 8 illustrates substates which may be owned by UE in the RRC_IDLE state and a substate transition process.

Referring to FIG. 8, UE performs an initial cell selection process (S801). The initial cell selection process may be performed when there is no cell information stored with respect to a PLMN or if a suitable cell is not discovered.

If a suitable cell is unable to be discovered in the initial cell selection process, the UE transits to any cell selection state (S802). The any cell selection state is the state in which the UE has not camped on a suitable cell and an acceptable cell and is the state in which the UE attempts to discover an acceptable cell of a specific PLMN on which the UE may camp. If the UE has not discovered any cell on which it may camp, the UE continues to stay in the any cell selection state until it discovers an acceptable cell.

If a suitable cell is discovered in the initial cell selection process, the UE transits to a normal camp state (S803). The normal camp state refers to the state in which the UE has camped on the suitable cell. In this state, the UE may select and monitor a paging channel based on information provided through system information and may perform an evaluation process for cell reselection.

If a cell reselection evaluation process (S804) is caused in the normal camp state (S803), the UE performs a cell reselection evaluation process (S804). If a suitable cell is discovered in the cell reselection evaluation process (S804), the UE transits to the normal camp state (S803) again.

If an acceptable cell is discovered in the any cell selection state (S802), the UE transmits to any cell camp state (S805). The any cell camp state is the state in which the UE has camped on the acceptable cell.

In the any cell camp state (S805), the UE may select and monitor a paging channel based on information provided through system information and may perform the evaluation process (S806) for cell reselection. If an acceptable cell is not discovered in the evaluation process (S806) for cell reselection, the UE transits to the any cell selection state (S802).

Now, a device-to-device (D2D) operation is described. In 3GPP LTE-A, a service related to the D2D operation is called a proximity service (ProSe). Now, the ProSe is described. Hereinafter, the ProSe is the same concept as the D2D operation, and the ProSe and the D2D operation may be used without distinction.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 9:
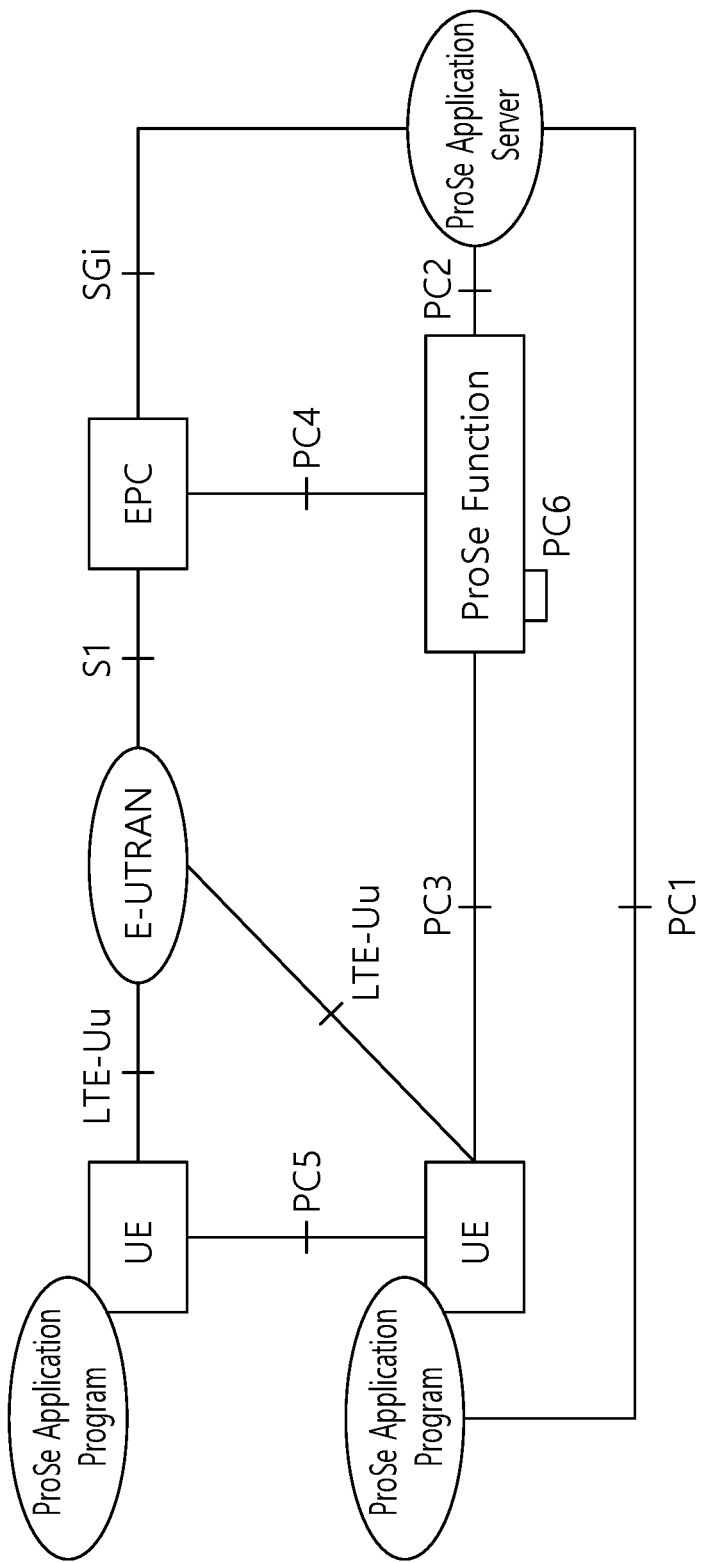
FIG. 9 shows a basic structure for ProSe.

FIG. 9 shows a basic structure for ProSe.

Referring to FIG. 9, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.
Interworking via a reference point toward the 3rd party applications Authorization and configuration of UE for discovery and direct communication Enable the functionality of EPC level ProSe discovery ProSe related new subscriber data and handling of data storage, and also handling of the ProSe identities Security related functionality Provide control towards the EPC for policy related functionality Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

Hereinafter, the handover will be described.

A handover signaling procedure supports both of an inter-eNB handover and an inter-RAT handover. In this case, the inter-RAT handover is initiated through the S1 interface described above, and the inter-eNB handover is initiated through X2 interface, generally.

However,
in the case that a source eNB is not an RN, and X2 is not existed between a source eNB and a target eNB, or
in the case that a source eNB is an RN, and X2 is not existed between a DeNB and a target eNB or X2 is not existed between a source RN and a DeNB, or
in the case that a source eNB is an RN, and a serving MME of a UE is not included in MME pool(s) connected with a target eNB, or
in the case that it is configured to initiate a handover to a specific eNB through S1 such that a source eNB is able to change an EPC node (MME and/or serving GW), or
in the case that a source eNB is going to start an inter-eNB handover through X2 but receives a negative response from a target eNB with a specific cause value, The inter-eNB handover is initiated through the S1 interface.

Figure 10:
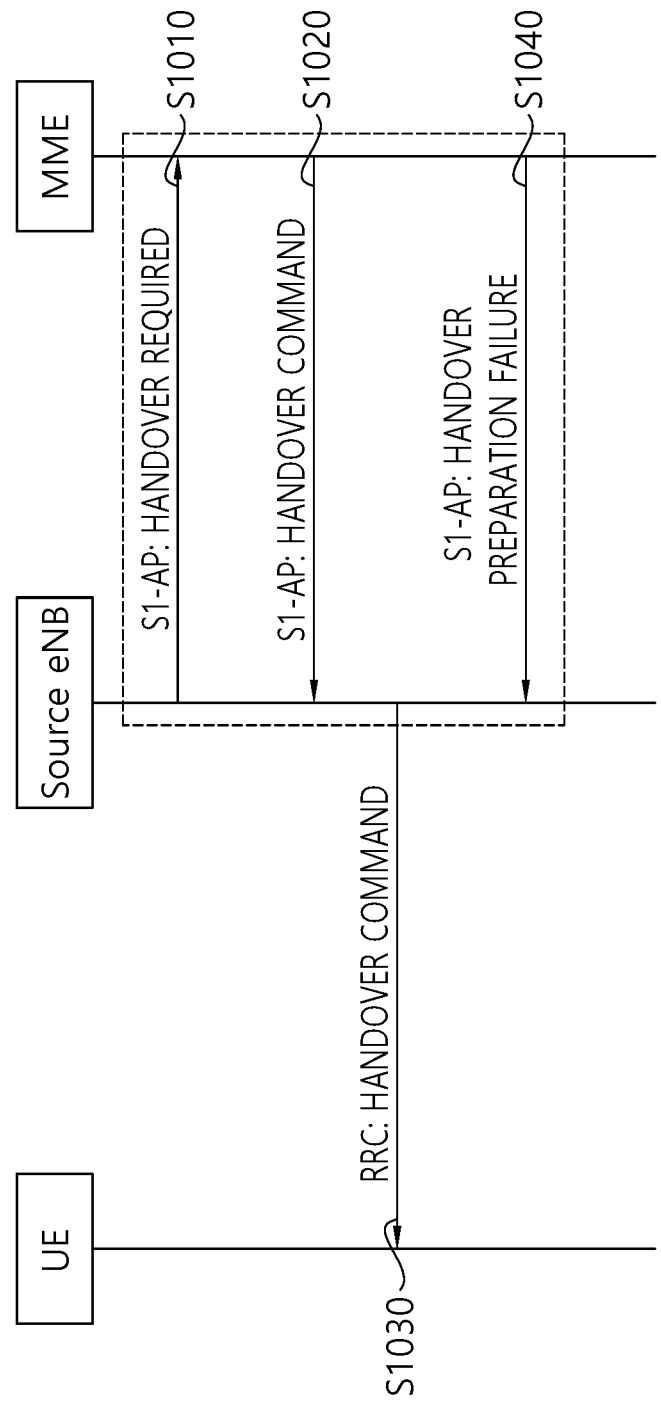
FIG. 10 is a flowchart for a handover ready procedure.

FIG. 10 is a flowchart for a handover ready procedure.

Referring to FIG. 10, a source eNB transmits a handover request message to an MME (step, S1010).

Later, the source eNB receives a handover command message from the MME (step, S1020).

The source eNB may transmit the handover command message to a UE (step, S1030).

Upon receiving the handover command message from the source eNB (in this case, the handover command message includes information in relation to a radio interface (e.g., a handover command for the UE) a successfully established Enhanced Radio Access Bearer (E-RAB) and an E-RAB of which setup is failed), the handover ready procedure is finished.

In the case that a handover resource allocation is failed (e.g., in the case that there is no available resource on a target), the source eNB receives a handover ready failure message, instead of receiving the handover command message from the MME (step, S1040).

Figure 11:
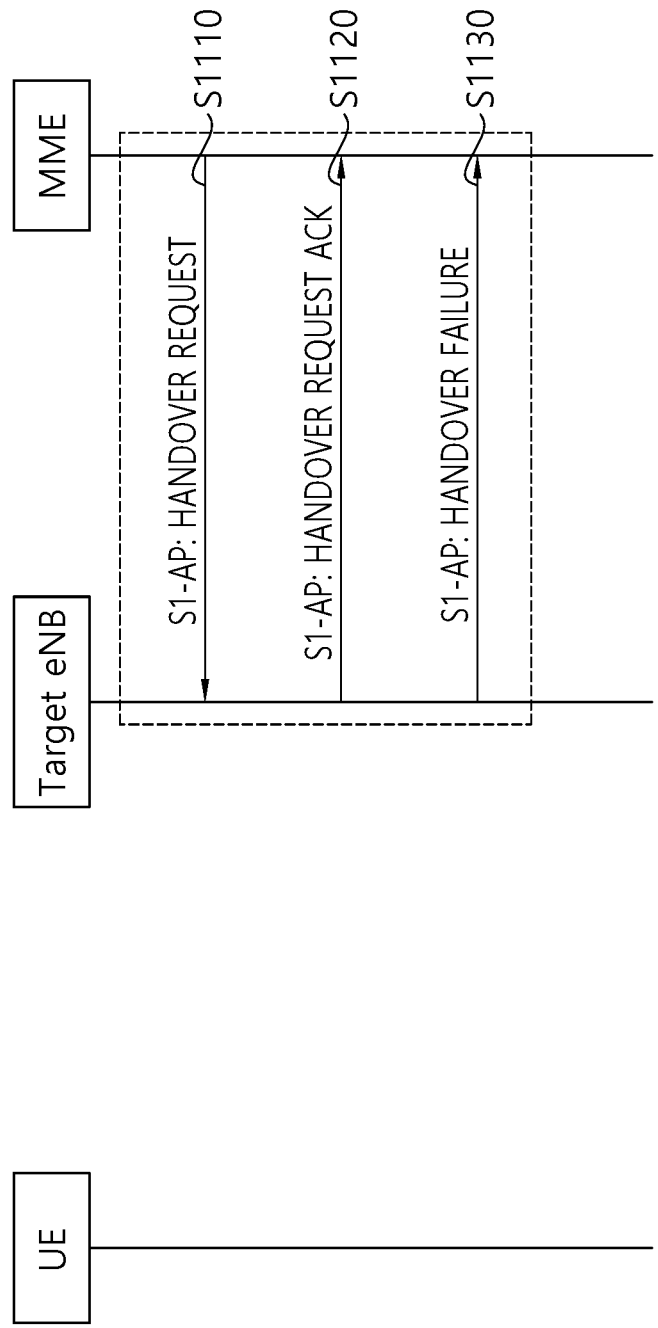
FIG. 11 is a flowchart for a handover resource allocation procedure.

FIG. 11 is a flowchart for a handover resource allocation procedure.

Referring to FIG. 11, a target eNB receives a handover request message from an MME (step, S1110), and the handover request message may include an E-RAB which is required to be setup by the target eNB.

In this case, for a UE that performs handover to an RN, the handover request message may be received by a DeNB. Here, the DeNB reads a target cell ID from the message, finds a target RN that corresponds to the target cell ID, and forwards the message to the target RN.

Later, the target eNB transmits a handover request ACK to the MME (step, S1120). More particularly, after allocating resources required for all accepted E-RAB, the target eNB may respond to the handover request ACK message. In this case, the handover request ACK message may include a successfully established E-RAB, an E-RAB of which setup is failed and information in relation to a radio interface (e.g., a handover command for the UE).

In the case that there is no available resource on an aspect of a target, the target eNB responds with a handover failure message, that is, transmits a handover failure message to the MME, instead of transmitting the handover request ACK message (step, S1130).

Hereinafter, the paging will be described.

Figure 12:
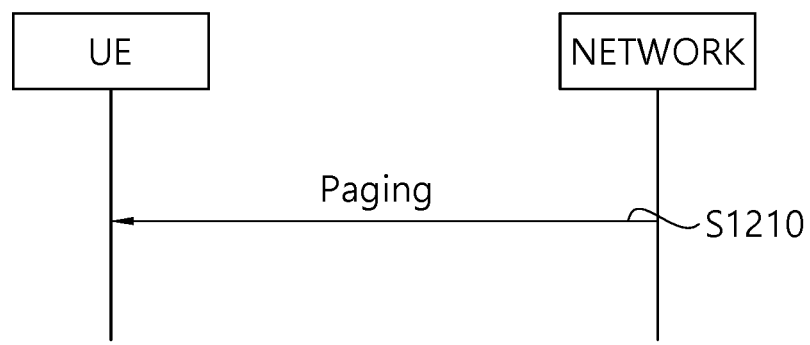
FIG. 12 is a flowchart schematically illustrating a procedure of paging.

FIG. 12 is a flowchart schematically illustrating a procedure of paging.

Referring to FIG. 12, a UE may receive a paging message from a network (step, S1210).

More particularly, an object of the procedure that the UE receives a paging message may be, for a transmission of paging information to the UE, when the network is in an RRC idle state and/or for informing a change of system information for the UEs in an RRC idle state and the UEs in an RRC connected state by the network, and/or for informing an ETWS primary notification and/or an ETWS secondary notification by the network, and/or for informing a CMAS notification by the network.

The paging information may be provided to a higher layer (e.g., NAS).

The network may initiate the paging procedure by transmitting a paging message on a paging occasion of the UE. In addition, the network may address the paging message to a plurality of UEs by including a paging record for each of the UEs in the paging message. Likewise, the network may indicate a change of the system information and/or provide an ETWS notification or a CMAS notification through (or based on) the paging message.

Hereinafter, the present invention will be described in detail.

Recently, owing to the development of the information communication industry, a user may have a variety of terminals simultaneously. For example, the case is increasing that a user has a smart phone and a smart watch, a user has a smart phone and a tablet PC, or a user has a smart watch and a tablet PC.

Each of a plurality of UEs possessed by a user may have a capability of performing a cellular operation. That is, each of a plurality of UEs may have a capability of performing a communication with an eNB independently. However, in the case that all of the UEs perform the procedure for each of the conventional cellular operations, an operation time of a UE of which battery capacity is relatively small is shorter than an operation time of a UE of which battery capacity is relatively great. For example, in the case that a user has both of a smart phone and a smart watch, and both of the smart phone and the smart watch perform the cellular operation and assuming that the amount of power consumed are the same, a battery of the smart watch of which battery capacity is smaller than that of the smart phone is discharged fast, and accordingly, the function of the smart watch is not fully fulfilled.

In the case that a plurality of UEs is proximate with each other as the case that a user has all of the UEs, a plurality of the UEs undergoes similar channel environment with respect to a specific network node (e.g., an eNB) that is going to communicate with. In addition, as described above, a plurality of the UEs has the common feature. In the conventional art, even in the case that each of a plurality of the UEs that is going to perform the cellular communication operation is in a similar channel environment, each of a plurality of the UEs performs all procedures (e.g., mobility procedure, paging procedure, handover procedure, scheduling procedure, etc.) that are required for the operation of the cellular communication. In addition, the UEs perform the cellular communication procedure independently without considering the characteristics that the UEs provide a communication service to the same user.

In the case that a plurality of UEs provides a communication service to the same user or a plurality of UEs undergoes the similar channel environment, it is available for a specific UE among a plurality of the UEs to work for the cellular communication procedure that other UE should perform. Particularly, when a capability of each of the UEs, for example, a processing power and/or battery capacity/residual battery amount is different, it is preferable for a UE that has enough capability works for the cellular communication procedure of a UE that has insufficient capability. As an example, it may be considered that the UE of great battery total capacity or residual battery capacity works for a part of the cellular procedure that should be performed by a UE of small battery total capacity or residual battery capacity.

Hereinafter, a method is proposed for guaranteeing a service quality that a user requires while minimizing the power consumption consumed by UEs when performing a cooperative communication between UEs (coordinated Tx/Rx), in the case that at least one of the following conditions are satisfied: 1) a user has a plurality of UEs, 2) a plurality of UEs is located normally proximate distance, 3) each of a plurality of UEs supports the cellular communication, 4) each of a plurality of UEs may perform the cellular communication when the cellular communication is required, 5) in the proximate range, a plurality of UEs supports the technique (e.g., WLAN or Bluetooth or sidelink communication based on LTE), which is able to perform a communication between a plurality of UEs with relatively low power in comparison with the cellular communication, 6) a battery capacity of a specific UE is small among a plurality of UEs and sensitive to the power consumption. As an example of the method, a method is proposed that a UE of which battery total capacity/residual battery capacity is relatively great works for a part of the cellular procedure of a UE of which battery total capacity/residual battery capacity is relatively small.

For example, in the case that UE 1 is a device (smart watch) of which battery capacity is small and UE 2 is a device (smart phone) of which battery capacity is great, a method and apparatus is to be proposed that UE 2 works for a procedure required for the cellular communication (transmission/reception) with a network and the cellular management in place of UE 1 such that UE 1 may operate in the power saving mode in an RRC connected mode with the aid of UE 2. Hereinafter, the process that UE 2 works for the cellular procedure for UE 1 may called that UE 2 provides a proxy-operation or a proxy-operation service to UE 1.

Hereinafter, for the convenience of description, the UE provided with the proxy-operation service from other UE is named as "a first UE" or "UE 1", and the UE that provides the proxy-operation service to other UE is named as "a second UE or "UE 2". As described above, the second UE may be a UE of which battery capacity/residual capacity is relatively greater than that of the first UE, or a UE of which computation capacity is relatively superior to that of the first UE. In addition, hereinafter, for the convenience of description, it will be described that the second UE works for the operation of the first UE. However, it is understood that this is just for the convenience of description, and the operation that the first UE works for the operation of the second UE is not excluded in the scope of the present invention.

Figure 13:
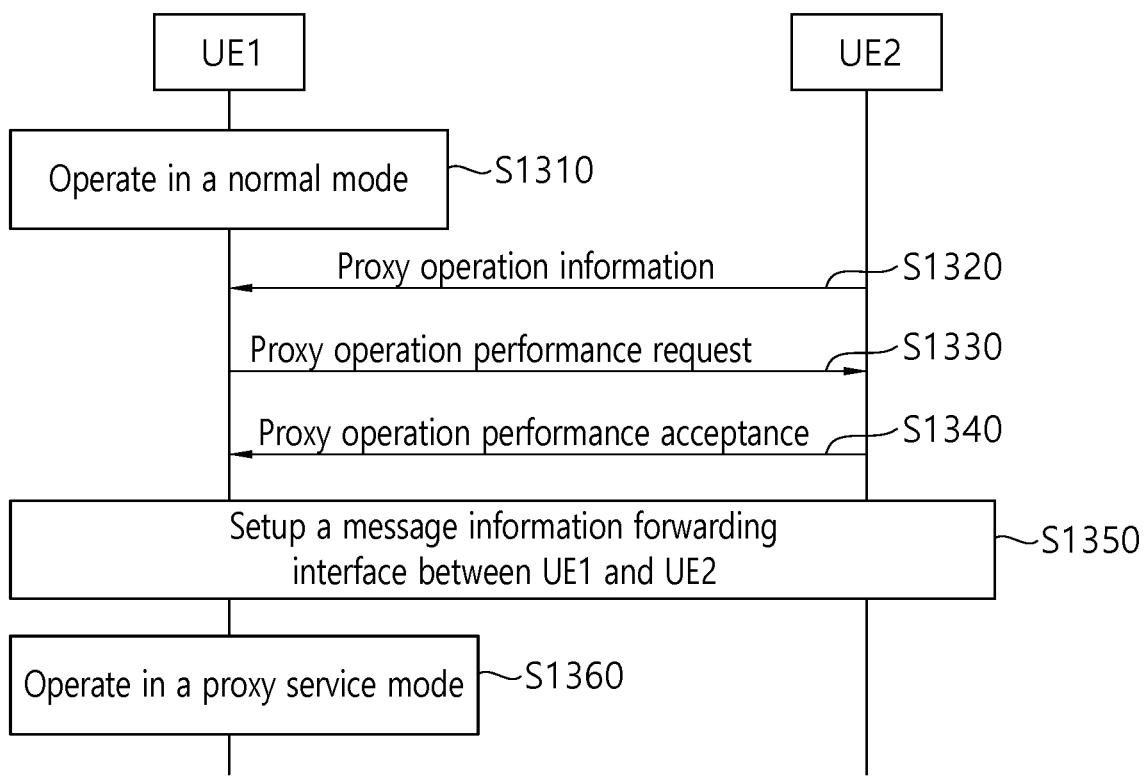
FIG. 13 is a flowchart for a procedure of determining a proxy-operation performance according to an embodiment of the present invention.

FIG. 13 is a flowchart for a procedure of determining a proxy-operation performance according to an embodiment of the present invention.

Referring to FIG. 13, a first UE operates in a normal mode (step, S1310). Here, the fact that the first UE operates in a normal mode may mean that the first UE is on performing a general procedure for the cellular communication (e.g., mobility procedure, paging procedure, handover procedure, scheduling procedure, etc.).

The second UE may determine to work for the procedure in relation to the cellular communication of the first UE, that is, to perform a proxy-operation (may also be referred as an agent operation). As described above, it may be called that the second UE provides a proxy-operation/proxy service to the first UE, or it may be represented that the second UE performs a proxy-operation for the first UE. The proxy-operation/proxy service may be referred as the second UE transmits and receives a signal of the first UE in place of the first UE. In the transmission and reception proxy of a signal, the signal of the first UE may mean a signal that an eNB is going to transmit to the first UE (like the conventional art) in the aspect of UE-dedicated signaling of downlink. The signal of the first UE may mean a signal of an eNB that the first UE should be measured for the connection management or the link quality measurement generally (like the conventional art) in the aspect of broadcast/common signaling of downlink. In the transmission and reception proxy of a signal, the signal of the first UE may mean a signal that the first UE is going to transmit to an eNB through common signaling or UE-dedicated signaling (like the conventional art) in the aspect of uplink. That is, in the transmission and reception proxy of a signal, the signal may include at least one of a control signal and data.

Here, the procedure of determining the proxy-operation may be triggered by the first UE or the second UE. For example, the second UE may broadcast the proxy operation information to at least one neighboring UE or may transmit the proxy operation information to a specific (or appointed) UE such as the first UE (step, S1320). In this case, the operation that the first UE receives the proxy operation information from the second UE is not an essential process of the present invention, but the first UE may transmit a proxy-operation request to the second UE by its own determination of the first UE. That is, the proxy-operation of the second UE may be triggered by the first UE.

The proxy operation information may include a factor representing whether the proxy-operation service is available, an identity of the second UE or a user code of the second UE, a service/application code in which the proxy operation is available to be provided, a type of direct communication link supportable, serving cell information of the second UE, and the like.

The first UE may determine whether the second UE is able to provide the proxy-operation service to the first UE itself based on the UE identity/user code/service code included in the received proxy operation information.

For example, the first UE may determine whether the second UE is able to provide the proxy-operation service to the first UE itself based on the UE identity/user code/service code included in the proxy operation information. The first UE may identify whether the second UE is a UE proper to provide the proxy-operation service by sending an inquiry through information stored in advance or to a network (e.g., proxy-operation service server existed in a network).

In the case that a service code is included in the proxy operation information, the first UE may operate as follows. When the service code that corresponds to a service that the first UE provides to a user is included in the received proxy operation information, the first UE may regard the second UE as a UE proper to provide the proxy operation service.

The direct communication link that is supportable in the proxy operation information means the communication link information used when exchanging message/data between UEs for the proxy operation service. Types of the direct communication link may include the communication links supported among the operation of Wi-Fi type (802.11 type), ZigBee type (802.15.4 type), Bluetooth type, sidelink in LTE-based licensed band and sidelink in LTE-based unlicensed band. For each communication link, the detailed parameter/capability information of the link may be provided, which is required for a connection between UEs of the corresponding link. In the case that a plurality of direct communication links is indicated, a priority value of each communication link may be indicated together. As serving cell information of the second UE, a serving cell identifier and a PLMN ID list in which the serving cell is belonged may be provided.

The proxy-operation information may be transmitted to a neighboring UE with being encrypted (e.g., with an integrity protection) or together with a digital signature. The first UE receives the proxy-operation information and decrypts and verifies the received information according to the encryption, and may perform the proxy-operation through the second UE only in the case that the information is verified.

After receiving the proxy-operation information, the first UE may transmit a message (proxy-operation performance request message) requesting to performing the proxy-operation to the second UE (step, S1330). As described above, the first UE may transmit the proxy-operation performance request message to the second UE after receiving the proxy-operation information. Otherwise, even in the case that the first UE fails to receive the proxy-operation information, the first UE may transmit the proxy-operation performance request message to the second UE with its own determination of the first UE.

Here, the proxy-operation performance request message may be i) directly transmitted to the second UE, ii) transmitted to the second UE through an eNB, or iii) transmitted to the second UE through an MME. The proxy-operation performance request message may be transmitted to the second UE through a direct communication link between UEs. An example of the direct communication link is one of Wi-Fi type (802.11 type), ZigBee type (802.15.4 type), Bluetooth type, sidelink in LTE-based licensed band and sidelink in LTE-based unlicensed band. Generally, the first UE may select a preferable link among the direct communication links. A determination of the preference among links may be according to the determination of an inner part of the first UE based on a link priority stored in the first UE in advance, a user configuration or at least one of the QoS of the service provided by the first UE and the residual battery capacity situation. In the case that the second UE notifies the preference among the direct communication links to the first UE already, the first UE may use the communication link that the second UE designates as the highest priority. The detailed example that the proxy-operation performance request message is transmitted to the second UE through an eNB or an MME will be described below.

For the proxy-operation performance request, the first UE may forward the following information to the second UE or a network node (e.g., an eNB or an MME, an HSS or a proxy-operation service server). In the case that the following information is forwarded to a network node, the information may be forwarded to the network node through the second UE. The information of the proxy-operation performance request may include a user code of the first UE, a user code of the second UE, a service code that the first UE wishes to be provided with the proxy-operation, a user preference, pre-configuration for the proxy-operation of the first and second UEs, a type of direct communication link usable between the first UE and the second UE, a direct link quality between first UE and the second UE, a signal reception quality of a specific cell measured by the first UE, a serving cell identifier of the first UE, and the like. Based on the information, it may be determined whether the proxy-operation performance request is accepted. The method of determining whether proxy-operation performance request is accepted includes 1) a method that the second UE determines whether to accept it finally and notifies the determination to a network and 2) a method that a network determines whether to accept it finally and notifies the acceptance to the second UE.

More particularly, in order to request the proxy-operation performance to the second UE or a network node (e.g., an eNB or an MME, an HSS or a proxy-operation service server), the first UE may transmit at least one of the following information.

User preference information of the first UE: For example, a user of the first UE may prefer the proxy-operation through the second UE. That is, in the case that the first UE (smart watch) and the second UE (smart phone) are possessed by the same user, the user may prefer that the second UE works for the operation of the first UE, which may be notified to the second UE by the first UE.

A user identifier/code of the first UE and/or a user identifier/code of the second UE. A UE or a network node that receives a user identifier/code to which the first UE is belonged and/or a user identifier/code to which the second UE is belonged may identify that the proxy-operation service performance is proper based on the information stored in advance or by performing an inquiry to the proxy-operation service server. The user identifier/code of the UE may be allocated from a network (e.g., MME) in a procedure that each UE registers in a cellular network or a subsequent procedure (i.e., Non-Access Stratum procedure), or may be allocated from a network (e.g., proxy-operation service server) through a separate proxy operation preparation procedure that may be performed before the procedure of the proxy operation performance request-acceptance.

A service code that the first UE wishes to be provided with the proxy-operation/a service code that the second UE may provide the proxy operation. Based on the information, it may be determined whether it is proper or not to provide a proxy operation service in relation to a specific service between two UEs. The identifier/code corresponding to each service may be allocated from a network (e.g., MME) in a procedure that a UE registers in a cellular network or a subsequent procedure (i.e., Non-Access Stratum (NAS) procedure), or may be allocated from a network (e.g., proxy-operation service server) through a separate proxy operation preparation procedure that may be performed before the procedure of the proxy operation performance request-acceptance.

Pre-configured association information of the first UE and the second UE (i.e., the information indicating that the first UE and the second UE are associated for the operation of the present invention. For example, it may be identified that there may be the pre-configured association between the UEs of the same user or the UEs of different users included in the same user group.).

A type of direct communication link supported between the first UE and the second UE. An example of the direct communication link is one of Wi-Fi type (802.11 type), ZigBee type (802.15.4 type), Bluetooth type, sidelink in LTE-based licensed band and sidelink in LTE-based unlicensed band. A network may designate a specific communication link or provide a usable communication link list to a proxy operation provider/receiver UE using the direct communication link that may be used for the proxy operation.

Link quality information between the first UE and the second UE measured by the first UE. For example, the second UE may transmit a reference signal or data to the link or the first UE may measure a reception quality of the reference signal and notify it to the second UE. For this, the second UE may broadcast the reference signal used for a measurement periodically. Here, the link quality may mean a sidelink link quality. As another example, the link may be a link quality of Wi-Fi (e.g., measured Received Signal Strength Indicator (RSSI)).

A reception quality of a signal such as RSRP/RSRQ of a specific cell measured by the first UE. For example, the first UE may measure a reception quality of a signal targeted to the cell designated by its own serving cell or the second UE (e.g., a serving cell of the second UE) and notify it to the second UE.

Serving cell information of the first UE (e.g., a serving cell ID of the first UE) and PLMN information (e.g., R-PLMN ID that the first UE registers or selected PLMN ID)

An RRC state of the first UE. For example, it may be identified whether the state is an RRC_IDLE or an RRC_CONNECTED.

A proxy operation procedure list that the first UE wishes to be provided. The proxy operation procedure list means a list that notifies the proxy operation procedure that the first UE wishes to be provided from the second UE among the procedures that the first UE is required to perform the cellular communication. For example, the list may indicate a paging procedure proxy, a scheduling monitoring proxy, a data transmission and reception proxy (particularly, it is available to be specifically indicated such as a transmission only proxy, a reception only proxy, and transmission and reception proxy, etc.), a control message transmission and reception proxy (it is also available to particularly indicate such as an RRC message transmission and reception proxy, a NAS message transmission and reception proxy, etc.), a mobility procedure proxy (it is also available to particularly indicate such as an idle mode mobility proxy, a connected mode mobility proxy, etc.).

A proxy operation procedure list that the second UE may provide. This list means a list that notifies a proxy operation that the second UE may provide to the first UE such that the first UE may perform the cellular communication through the second UE. An example of the proxy operation that may be included in the list is the same as that of the proxy operation included in the proxy operation procedure list that the first UE wishes to be provided.

In response to the proxy operation performance request, the first UE receives a proxy operation performance acceptance message from the second UE (step, S1340). The proxy operation performance acceptance message (i.e., a message in response to the proxy operation request) may include the following information.

A service code that the second UE is decided to provide for the proxy operation.

A type of direct communication link between the first UE and the second UE used for the proxy operation and a link configuration parameter.

Link quality information between the first UE and the second UE measured by the second UE.

A reception quality of a signal such as RSRP/RSRQ of a specific cell measured by the second UE.

Serving cell information of the second UE (e.g., a serving cell ID of the first UE) and PLMN information (e.g., R-PLMN ID that the first UE registers or selected PLMN ID)

An RRC state of the second UE.

A proxy operation procedure list that the second UE determines to provide.

As described above, in the case that performing of the proxy operation is determined through signaling between UEs, either one of the UEs (i.e., the first UE or the second UE) among the UEs associated with the proxy operation may notify that performing of the proxy operation is determined to a network.

For example, the second UE that is going to work for the mobility procedure may notify that the second UE is going to work for the mobility procedure of the first UE to its own serving cell. In this case, the eNB belonged to the serving cell of the second UE may request and receive the UE context of the first UE (e.g., the UE capacity of the first UE), the service information of the first UE and the bearer configuration information (including QoS parameter) of the first UE to a serving cell eNB of the first UE or an MME that corresponds to the R-PLMN of the first UE.

As another example, the second UE that is going to work for the mobility procedure may notify that the second UE is going to work for the mobility procedure of the first UE to its own serving CN (e.g., MME) through a NAS message. In this case, the CN node may make the UE context of the second UE include the UE context of the first UE. That is, the UE context of the second UE may be updated to further include the UE context of the first UE, and the updated UE context of the second UE may be transmitted to the eNB of the second UE (according to this scheme, a change of the eNB may be minimized.

The network that determines to do the proxy operation between the first UE and the second UE (or the network that identifies that the proxy operation between the first UE and the second UE is determined) may select an appropriate cell for the proxy operation. In this case, for example, the network may select an optimal serving cell by reference to the information included in the proxy operation performance request message described above, the measurement report transmitted by the second UE, the R-PLMN and/or Selected PLMN of the first UE and the second UE, and the like.

When a cell for the proxy operation is determined, the network may command the first UE to perform handover or cell reselection and make the first UE move to the corresponding cell, and may also command the second UE to perform handover and to move to the corresponding cell. Through this, the first UE and the second UE may be connected with the same PLMN/MME and the same serving cell.

Later, a message information forwarding interface is setup between the first UE and the second UE (step, S1350).

More particularly, to the second UE that provides the proxy operation service to the first UE, an additional radio bearer (i.e., a radio bearer for transmitting traffic accompanied by the proxy operation) may be configured. The configuration for an additional radio bearer between the second UEs may also be based on an RRC message received from the network. According to a network configuration, the additional radio bearer may be configured dedicated to the proxy operation but may also be configured so as to be used for a transmission of data traffic of the second UE. The network may reconfigure a specific bearer among the pre-configured radio bearers so as to transmit the traffic accompanied by the proxy operation.

Here, the additional radio bearer configuration may be divided into Uu interface between an eNB and a UE and PC5 interface between UEs. The second UE may also construct an additional layer 2 entity and an additional channel (e.g., physical channel, transport channel or logical channel) with respect to each of the additional radio bearer configurations.

For a proxy radio bearer configuration in the Uu interface between an eNB and a UE, the network may also configure an Evolved packet system (EPS) bearer corresponding to the second UE. The EPS bearer is mapped to the proxy radio bearer for the first UE, and the second UE may relay a bearer service corresponding to the first UE by being setup to the second UE. At this point, the CN may identify the proxy radio bearer, that is, the additional radio bearers are associated with the proxy operation of the second UE. In this case, the eNB may notify that the additional radio bearer is the proxy radio bearer to the second UE. The CN may discriminate the priority of the proxy radio bearer and a normal radio bearer. In this case, the discrimination of the priority may be based on the scheme of newly determining a value of QoS Class Identifier (QCI) or Allocation and Retention Priority (ARP) or the scheme of defining new QoS parameter. Alternatively, in order to share the fact that the bearer is the proxy operation service between an MME and an eNB, it may considered to introduce a new flag (may be an indicator constructed as 1 bit) mapped to the bearer configuration information or to perform signaling of the flag between an eNB and an MME.

As described above, in the case that additional radio bearers for the first UE are configured for the second UE, the second UE may notify the radio bearer configuration described above to the first UE, and through this, the first UE may configure an additional radio bearer.

The radio bearer added to the second UE may include a radio bearer constructed in the Uu interface, which is a communication interface between an eNB and a UE and a radio bearer constructed in the inter-UE direct communication interface between the second UE and the first UE. The inter-UE direct communication interface may include an inter-UE direct communication interface based on LTE, that is, PC5 interface (sidelink). In this case, the first UE may configure a Sidelink Radio Bearer for the PC5 interface. Here, when the first UE configures the direct communication link for the proxy operation or the radio bearer for the proxy operation with the second UE, the first UE may release the corresponding radio bearers in the Uu interface. The release of the bearers may be performed by an instruction of an eNB or a determination of the UE itself, after the configuration of the inter-UE direct communication link for the proxy operation or the radio bearer is completed.

In addition, the first UE may transmit UE configuration information of the first UE to the second UE. The configuration information may include a physical layer configuration, a MAC configuration, an RLC configuration and a PDCP configuration of the UE. The second UE that receives the UE configuration information may use the information for performing the proxy operation. For example, in order for the second UE to receive downlink data in place of the first UE and/or to transmit uplink data in place of the first UE, it may be required for the second UE to construct an RLC entity and a PDCP entity of the second UE according to the RLC, PDCP configuration of the first UE.

In order for the second UE to receive downlink data in place of the first UE and/or to transmit uplink data in place of the first UE, it is also available for the second UE to construct an additional MAC entity according to the MAC configuration of the first UE and to construct an additional PHY configuration according to the PHY configuration of the first UE.

Later, the first UE enters a proxy service mode state (step, S1360). The proxy service mode may be referred to as a mode that omits a part or a most part of the procedure performed by a UE in a normal mode. For example, the first UE performs a paging procedure, a scheduling monitoring, a data transmission and reception, and the like in the normal mode, but may not directly perform at least one of the operations in the proxy service mode. In this case, the operation not directly performed by the first UE may be worked by the second UE. Accordingly, the power consumption of the UE in the proxy service mode is smaller than that of the UE in the normal mode, generally. Therefore, the proxy service mode may also be called a power saving mode. Hereinafter, for the convenience of description, the proxy service mode may be referred to as the power saving mode. The power saving mode (i.e., proxy service mode) may be implemented in the form that the second UE works for a part (or the whole) of the procedure for the cellular communication of the first UE or that the first UE omits or perform with a low frequency a part (or the whole) of the procedure for the cellular communication, and the state itself for performing the operation may also be referred to as the power saving mode.

More particularly, the first UE, when the second UE is going to perform the proxy operation procedure for the first UE, may operate in the power saving mode according to an indication of the second UE or an indication of an eNB or an MME. Here, 1) In the case that the first UE is in an RRC connected mode, The UE in the RRC connected state (or mode) may omit or perform with a low frequency the operations that the first UE should perform in the normal RRC connected mode, while the first UE is in the power saving mode (i.e., proxy service mode). For example,

- The first UE may not perform a measurement of a serving cell and/or a neighboring cell, which is required for the mobility support.
- The first UE may omit the measurement report procedure which is required for the mobility support. That is, the UE may omit the evaluation of a measurement report event and the resulted measurement report.
- The first UE may perform a measurement of a serving cell and/or a neighboring cell, which is required for the mobility support with a low frequency in comparison with the second UE.
- The first UE may not perform a control channel monitoring which is required for the mobility support.
- The first UE may perform a control channel monitoring which is required for the mobility support with a low frequency in comparison with the second UE.
- The first UE may not perform a control channel monitoring which is required for downlink scheduling.
- The first UE may omit a paging reception for maintaining an SIB as the latest state in the connected mode.
- The first UE may omit a paging reception for receiving an urgent message in the connected mode.
- The first UE may omit a Radio Link Monitoring (RLM) procedure for determining that a use of the RRC connection is usable.

2) In the case that the first UE is in an RRC idle mode,

The UE in the RRC idle mode may omit or perform with a low frequency the operations that the first UE should perform in the normal RRC idle mode, while the first UE is in the power saving mode. For example,

- The first UE may not perform a measurement of a serving cell and/or a neighboring cell, which is required for the mobility support.
- The first UE may perform a measurement of a serving cell and/or a neighboring cell, which is required for the mobility support with a low frequency in comparison with the second UE.
- The first UE may omit an evaluation of cell selection/cell reselection which is required for the mobility support and the consequential cell selection/cell reselection.
- The first UE may omit a paging reception for maintaining an SIB as the latest state in the idle mode.
- The first UE may omit a paging reception for receiving a disaster message (e.g., ETWS, commercial mobile alert system (CMAS) and Korean Public Alert System (KPAS)) in the idle mode.

In addition, while the first UE is in the power saving mode, the first UE may be switched from the RRC connected mode to the RRC idle mode, may operate in the power saving mode, or may monitor a downlink channel according to the 'Extended DRX cycle' which is more extended than the Discontinuous Reception (DRX) cycle which is currently configured.

For the power saving mode operation of the first UE, a network may transmit an RRC message to the first UE and the second UE, and may configure the following parameter values. In this case, the network may transmit the RRC message directly to the first UE or may transmit the RRC message to the first UE through the second UE.

Timer value for the power saving mode: In the case of receiving the parameter value from the network, the first UE may start the timer when receiving the power saving mode, and may be switched from the power saving mode to the normal mode when the timer expires. The second UE may also drive the timer, and may determine whether the first UE is in the power saving mode. For example, in the case that the first UE enters the power saving mode, the second UE may start the timer which is the same as the timer started in the first UE. Later, when the timer in the second UE expires, the second UE may determine the timer of the first UE to be expired too. Accordingly, the second UE may also determine whether the first UE enters the normal mode from the power saving mode. In the case that the first UE does not receive the parameter value from the network, the first UE (or the second UE) may setup the timer value as being infinite. In this case, the first UE may maintain the power saving mode until receiving a separate information (or message).

Paging DRX cycle in the power saving mode: In the case of receiving the parameter value from the network, the first UE may monitor paging according to the parameter value when the first UE in the RRC idle state enters the power saving mode.

Long/short DRX cycle in the power saving mode: In the case of receiving the parameter value from the network, the first UE may perform the DRX according to the parameter value when the first UE in the RRC connected state enters the power saving mode.

Configuration and specific parameter indicating the procedure that the first UE should perform even after entering the power saving mode, or the procedure that the first UE may omit or perform in a low frequency.

Figure 14:
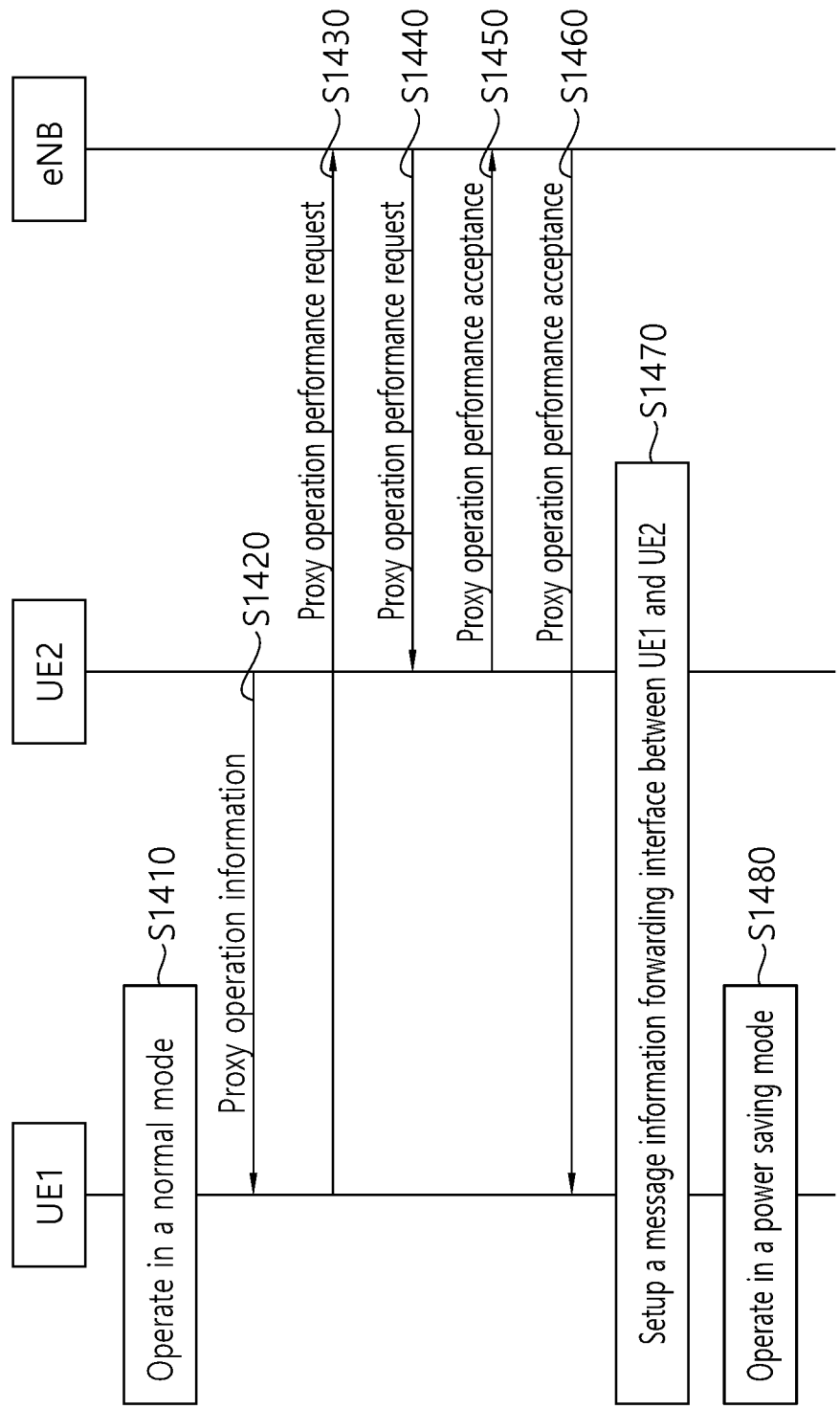
FIG. 14 is a flowchart for a procedure of determining a proxy-operation performance according to another embodiment of the present invention.

FIG. 14 is a flowchart for a procedure of determining a proxy-operation performance according to another embodiment of the present invention.

Referring to FIG. 14, a first UE operates in a normal mode (step, S1410). As described above, the fact that the first UE operates in a normal mode may mean that the first UE is on performing a general procedure for the cellular communication (e.g., mobility procedure, paging procedure, handover procedure, scheduling procedure, etc.).

The second UE may broadcast the proxy operation information to at least one neighboring UE or may transmit the proxy operation information to a specific (or appointed) UE such as the first UE (step, S1420). In this case, the details that the first UE receives the proxy operation information from the second UE are as described above.

After the first UE receives the proxy operation information from the second UE, or after the first UE itself determines even in the case that the first UE does not receive the proxy operation information from the second UE, the first UE may transmit a request message for the proxy operation performance to an eNB (step, S1430).

Later, the eNB transmits a proxy operation performance request message to the second UE (step, S1440).

In response to the proxy operation performance request, the second UE transmits a proxy operation performance acceptance message with the information of a message information forwarding interface between UEs to the eNB (step, S1450).

Later, the eNB transmits a proxy operation performance acceptance message with the information of a message information forwarding interface between UEs (step, S1460).

As described above, when the proxy operation performance is determined through signaling between UEs, a UE (i.e., the first UE or the second UE) among the UEs associated with the proxy operation may notify that the performance of the proxy operation is determined to the eNB, and the detailed examples of the notification that the performance of the proxy operation is determined to the eNB are as described above.

Later, a message/data information forwarding interface is setup between the first UE and the second UE (step, S1470). In this case, the detailed examples of the message/data information forwarding interface setup between the first UE and the second UE are as described above.

Later, the first UE enters the state of saving power, that is, operates in the power saving mode (step, S1480). Here, the detailed examples of the power saving mode are as described above.

Figure 15:
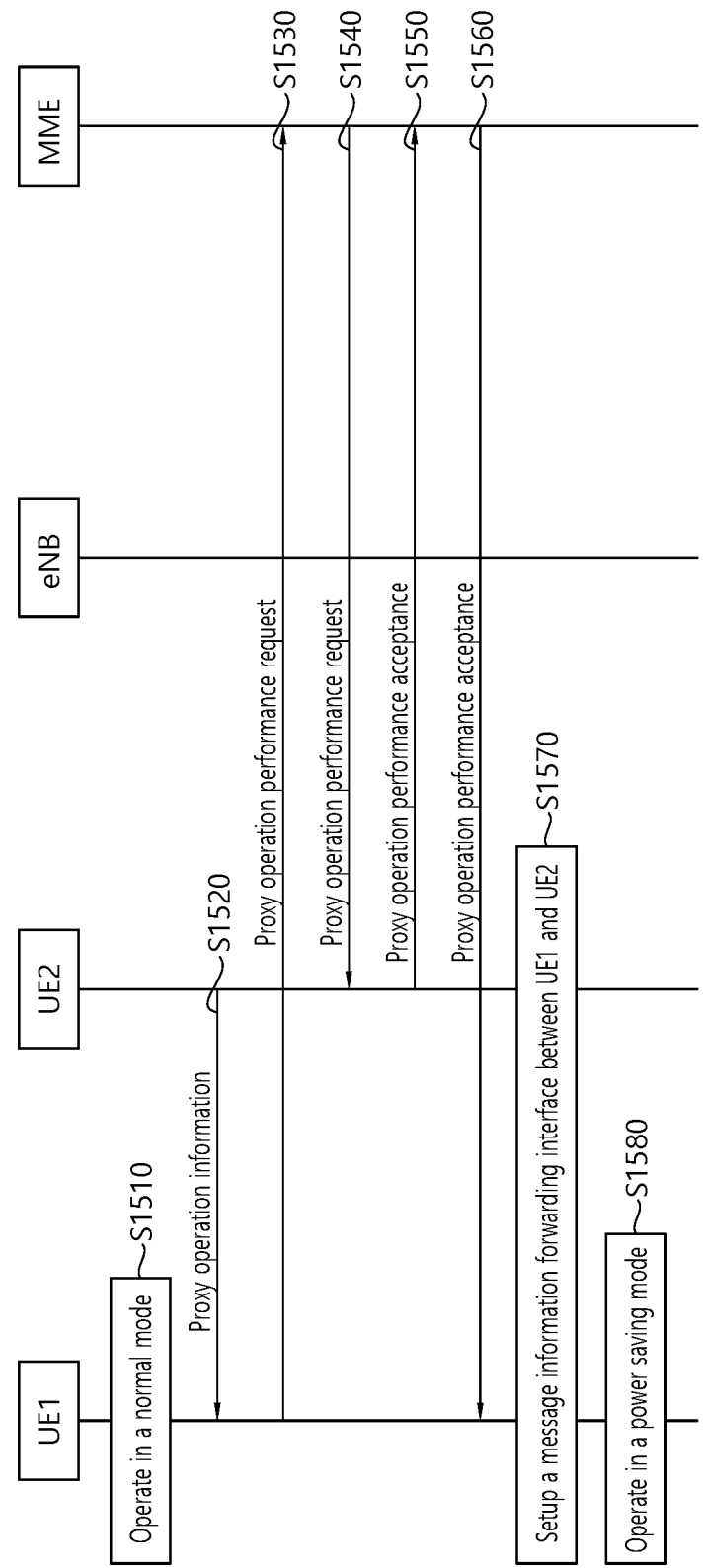
FIG. 15 is a flowchart for a procedure of determining a proxy-operation performance according to still another embodiment of the present invention.

FIG. 15 is a flowchart for a procedure of determining a proxy-operation performance according to still another embodiment of the present invention.

Referring to FIG. 15, a first UE operates in a normal mode (step, S1510). As described above, the fact that the first UE operates in a normal mode may mean that the first UE is on performing a general procedure for the cellular communication (e.g., mobility procedure, paging procedure, handover procedure, scheduling procedure, etc.).

The second UE may broadcast the proxy operation information to at least one neighboring UE or may transmit the proxy operation information to a specific (or appointed) UE such as the first UE (step, S1520). In this case, the details that the first UE receives the proxy operation information from the second UE are as described above.

After the first UE receives the proxy operation information, or after the first UE itself determines even in the case that the first UE does not receive the proxy operation information, the first UE may transmit a request message for the proxy operation performance to a network node (e.g., a proxy operation service server or an MME) (step, S1530).

Later, the network node transmits a proxy operation performance request message to the second UE (step, S1540).

In response to the proxy operation performance request, the second UE transmits a proxy operation performance acceptance message with the information of a message information forwarding interface between UEs (step, S1550).

Later, the network node transmits a proxy operation performance acceptance message with the information of a message information forwarding interface between UEs (step, S1560).

As described above, when the proxy operation performance is determined through signaling between UEs, a UE (i.e., the first UE or the second UE) among the UEs associated with the proxy operation may notify that the performance of the proxy operation is determined to the eNB, and the detailed examples of the notification that the performance of the proxy operation is determined to the eNB are as described above.

Later, a message information forwarding interface is setup between the first UE and the second UE (step, S1570). In this case, the detailed examples of the message information forwarding interface setup between the first UE and the second UE are as described above.

Later, the first UE enters the state of saving power, that is, operates in the power saving mode (step, S1580). Here, the detailed examples of the power saving mode are as described above.

Figure 16:
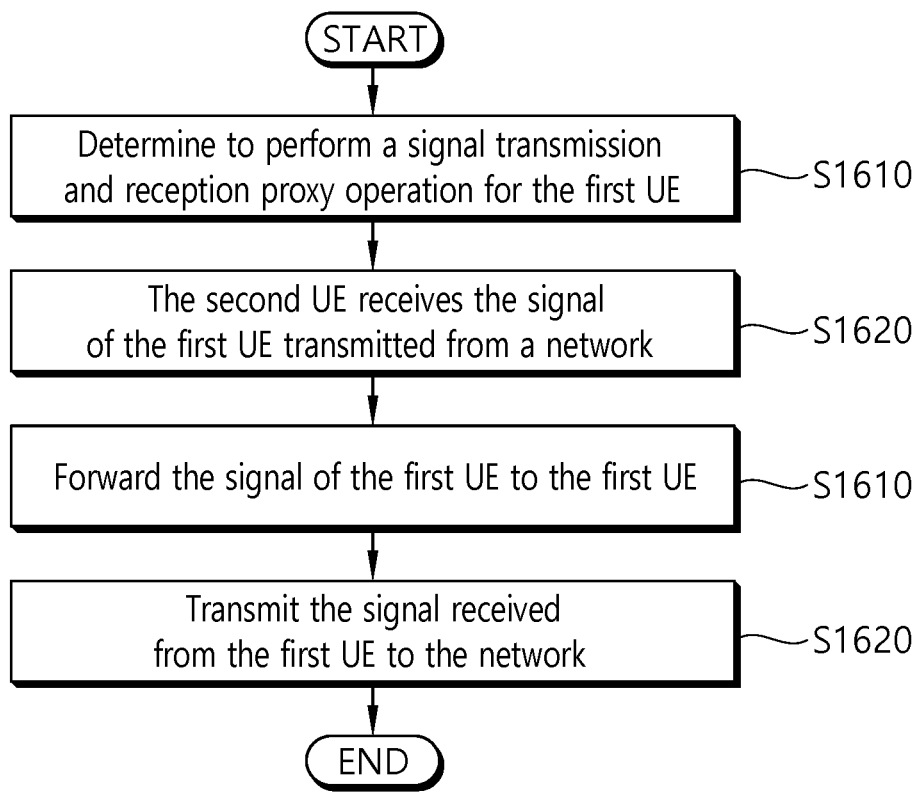
FIG. 16 illustrates a communication method performed by the second UE according to an embodiment of the present invention.

FIG. 16 illustrates a communication method performed by the second UE according to an embodiment of the present invention.

Referring to FIG. 16, the second UE may determine to perform a signal transmission and reception proxy operation for the first UE (step, S1610). The determination procedure is as described above with reference to FIG. 13 to FIG. 15.

The second UE receives the signal of the first UE transmitted from a network (step, S1620).

The second UE forwards the signal of the first UE to the first UE (step, S1630).

The second UE transmits the signal received from the first UE to the network (step, S1640).

Referring to FIG. 16, the second UE may monitor the control information that the network transmits to the first UE. In addition, the second UE may receive the data that the network transmits to the first UE. In this case, the control information that the network transmits to the first UE may be identified by an identifier of the first UE. For example, the control that the network transmits to the first UE may be monitored in a search space indicated by the identifier of the first UE. That is, the second UE monitors the control information transmitted to the first UE using the identifier of the first UE. In order to enable this, the second UE may receive the identifier of the first UE from the network or the first UE in advance.

Alternatively, the control information that the network transmits to the first UE may be identified by an identifier of the second UE. In this case, the control information that the network transmits to the first UE may include a field representing that the control information is with respect to the first UE.

In the case that the second UE receives the data that the network transmits to the first UE, the second UE may forward the data to the first UE. The data may be either one of a higher layer message transmitted through a signaling radio bearer (SRB) and a user data transmitted through a data radio bearer (DRB).

The second UE may provide the information representing whether the data is a higher layer message transmitted through an SRB and a user data transmitted through a DRB to the first UE.

Using the uplink resource allocated to the first UE by the network, the second UE may transmit the uplink data of the first UE.

The second UE may request the uplink resource for the first UE to the network, and may transmit the uplink data of the first UE using the uplink resource allocated from the network by the request.

In the case that the second UE determines to work for the signal transmission and reception for the first UE, the first UE may operate in the power saving mode. In the power saving mode, the first UE may not perform a measurement of a serving cell and a neighboring cell which is required for performing a procedure in relation to the mobility, may perform the measurement of a serving cell and a neighboring cell which is required for performing a procedure in relation to the mobility with a lower frequency than the second UE, may omit a paging reception, or may perform the paging reception with a lower frequency than the second UE. The second UE may be a UE of which battery capacity is greater than that of the first UE.

The second UE may receive the configuration information of the first UE from the first UE, and may work for the signal transmission and reception for the first UE based on the configuration information.

Now, each step of the FIG. 16 will be described in detail.

Assuming the case that the second UE determines to perform a proxy operation, that is, to receive a signal for the first UE in place of the first UE, the second UE may monitor a downlink control channel that the network is going to transmit to the first UE. The downlink control channel may be a physical downlink control channel (PDCCH), for example.

One of the following methods may be used for the second UE to monitor the downlink control channel for scheduling of the first UE.

First, the second UE may monitor the downlink control channel of the first UE using its own identifier. In the case that the downlink control channel is for downlink scheduling (e.g., PDCCH), the eNB may perform the downlink scheduling of the first UE using the identifier of the second UE. For example, a PDCCH for a specific UE may include an identifier of the specific UE, for example, downlink control information (DCI) to which Cyclic Redundancy Check (CRC) masked by a cell-Radio Network Temporary Identifier (C-RNTI) is added. The eNB may add the masked CRC as an identifier of the second UE to the DCI included in the PDCCH for the first UE. The PDCCH for the first UE (more particularly, a DCI for the first UE) may not include a separate field representing that the PDCCH is for scheduling of the first UE. A physical layer (PHY) of the second UE may operate by identifying that the scheduling for the first UE is the scheduling for the second UE. According to the first method, there is an advantage that a change of layer 1 (PHY) of the second UE is minimized.

Second, the second UE may monitor the downlink control channel of the first UE using an identifier of the first UE. In this method, the eNB perform downlink scheduling of the first UE using the identifier of the first UE.

Particularly, the second UE monitors a UE-specific search space set to the first UE in addition to the common search space. In addition, the second UE monitors the PDCCH distinguished by an identifier (e.g., C-RNTI) of the first UE.

In addition, the second UE may give higher priority for monitoring the PDCCH for the second UE itself than for monitoring the PDCCH for the first UE, or on the contrary, may give higher priority for monitoring the PDCCH for the first UE than for monitoring the PDCCH for the second UE itself. The priority for monitoring the PDCCH may be determined according to the priority determined between the first and second UEs or the priority of the service provided by the first and second UEs.

Third, the second UE may monitor the downlink control channel of the first UE using its own identifier, but uses a field representing that it is the downlink control channel of the first UE. In the case of using this method, the eNB performs downlink scheduling using the identifier of the second UE, but adds a field representing that the PDCCH (more particularly, a DCI for the first UE) is for the first UE in the PDCCH for the first UE. The field may indicate an index for the first UE or an ID of the first UE. After the second UE detects the PDCCH for the first UE using its own C-RNTI, the second UE may distinguish whether the PDCCH is for the first UE or the second UE through the field. This method may be called cross-UE scheduling.

In addition, the second UE determines to perform a proxy operation, that is, to receive a signal for the first UE in place of the first UE, the second UE may monitor a data channel that the network is going to transmit to the first UE. The data channel may be a physical downlink shared channel (PDSCH).

The eNB, the first UE and the second UE may setup a proxy radio bearer for the proxy operation. The proxy radio bearer may be divided into a signaling radio bearer (SRB) and a data radio bearer (DRB), and separate SRB and DRB may be setup for the proxy operation. The separate SRB and DRB may be distinguished in Layer 2 by being distinguished through a separate logical channel identity (LCID) reserved for a use of the proxy radio bearer or including a new field indicating that a MAC SDU is the data corresponding to the proxy radio bearer in a MAC subheader.

When the second UE performs a Logical Channel Prioritization for multiplexing a logical channel in an uplink transmission, the eNB, the first UE and the second UE may give a specific priority for the proxy radio bearer. For example, the proxy signaling radio bearer (Proxy SRB) may have lower priority than the existing SRB0, SRB1 and SRB2 or may be setup as the priority as the same as SRB2 (priority of SRB2 is lower than that of SRB1 and SRB0). When the proxy SRB is generated, the second UE may determine the priority of the Proxy SRB autonomously. As another example, the proxy signaling radio bearer (Proxy SRB) may have the priority such as the lowest priority among the existing DRBs or may have a specific lower priority than the priority of the existing DRBs. Basically, the priority of the Proxy DRB also follows the priority value indicated by a network like other DRBs. The eNB may differently setup the priority of the logical channels such that the first and second UEs may process the separate radio bearers by discriminating the priority of the existing radio bearers.

In the case that the second UE works for a data reception of the first UE, the second UE may works for the PHY, MAC, RLC and PDCP operations that the first UE should perform when the first UE directly receives data from the eNB. The second UE may receive a data channel for the first UE using a required configuration among the PHY, MAC, RLC and PDCP of the first UE. The second UE may operate as if the configuration required for the operation required for receiving data among the PHY, MAC, RLC and PDCP configurations of the first UE is configured by receiving from the eNB. That is, the second UE operates as if it is the first UE.

Or, in the case that the second UE works for a data reception of the first UE, the second UE performs the proxy operation (works for the data reception) according to the PHY, MAC, RLC and PDCP configurations that may be used in the proxy operation, and performs the PHY, MAC, RLC and PDCP operations according to it.

Now, the process (step, S1630) will be described for forwarding a signal to the first UE by the second UE that receives the signal for the first UE in place of the first UE in FIG. 16.

In the case that the second UE performing the proxy operation receives the data that should transmitted to the first UE from the network, the second UE may transmit the data to the first UE. The data that the second UE transmits to the first UE may be an RRC message transmitted through an SRB. Or, the data that the second UE transmits to the first UE may be a user data (IP packet) transmitted through a DRB.

The data may be transmitted to the first UE directly from the second UE through an inter-UE direct communication link (i.e., using D2D communication) or may be transmitted through other communication node. For example, the data may be transmitted using a communication technique that may perform the information transmission between UEs with low power such as an inter-UE direct communication link using Wi-Fi, a communication link between UEs using Bluetooth or a direct communication link between UEs using LTE/LTE-A.

The data transmitted to the second UE through an inter-UE direct link for the purpose of transmitting data to the network by the first UE may be a MAC PDU, a RLC PDU, a PDCP PDU, or a PDU of PDCP higher layer (e.g., IP layer) of the first UE. When the second UE receives the data through the inter-UE direct link, the second UE determines to perform an uplink transmission by performing an additional a second sublayer processing by treating the data as an SDU of the second sublayer in the second UE depending on the fact that the received data is a PDU of a certain second sublayer.

Figure 17:
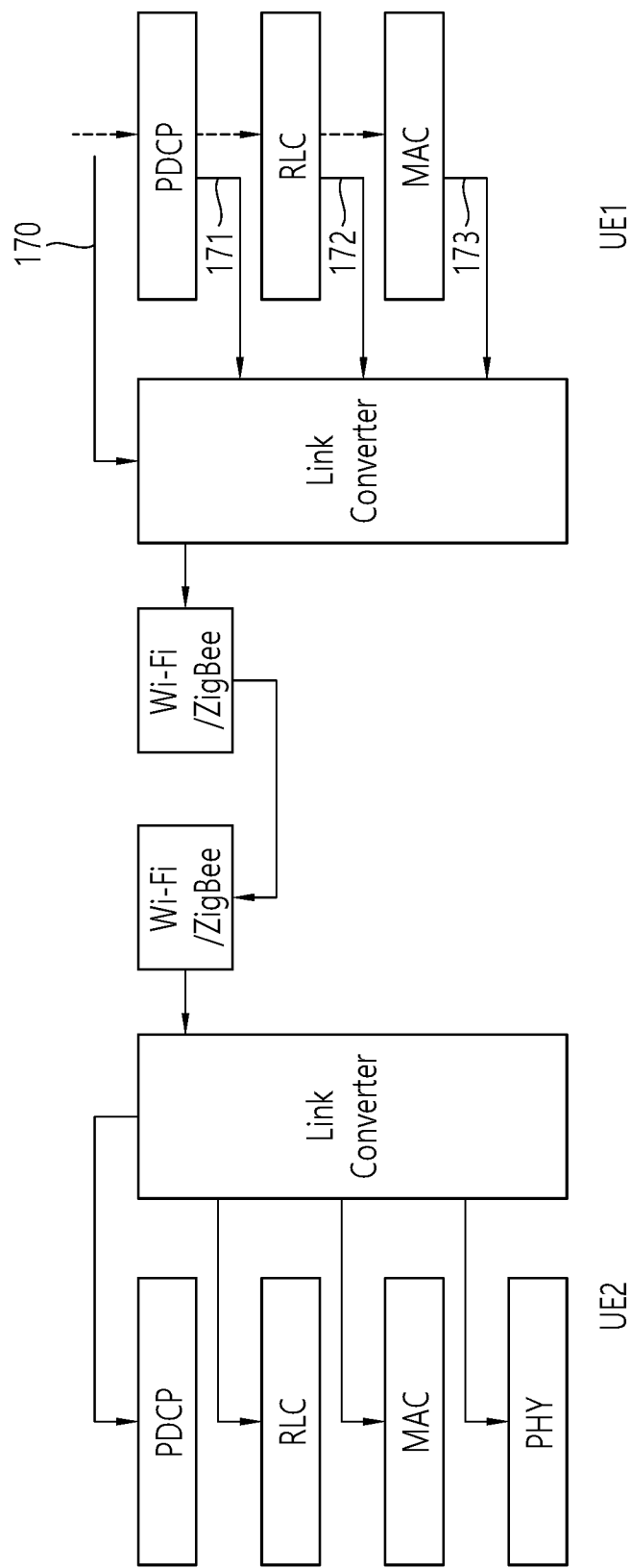
FIG. 17 illustrates an example of transmitting data to the second UE by the first UE.

FIG. 17 illustrates an example of transmitting data to the second UE by the first UE.

The data that the first UE (UE1) transmits to the second UE (UE2) may be the data that the first UE is going to transmit to a network. The first UE may transmit data to the second UE through the inter-UE direct link such as Wi-Fi, ZigBee, Bluetooth, sidelink provided in LTE-A (ProSe), and the like. The first UE may transmit the data processed only to a specific layer among its own protocol layers to the second UE. For example, the first UE may transmit the MAC PDU 173 that is the data processed up to MAC layer, the RLC PDU 172 processed up to RLC layer, PDCP PDU 171 processed up to PDCP layer or higher layer PDU 170 processed up to PDCH higher layer (e.g., IP layer) to the second UE.

The second UE that receives the data from the first UE may consider the layer in which the received data is processed. And after processing the next layer, second UE may transmit the data to the network. For example, when receiving a MAC PDU from the first UE, the second UE may transmit the data after performing an additional processing the data in PHY layer. When receiving a RLC PDU from the first UE, the second UE may transmit the data after performing an additional processing the data in MAC and PHY layer sequentially.

Meanwhile, when the first UE forwards the data to the second UE, a link converter may add a control field that indicates a type of the data to the data forwarded through the inter-UE direct link.

Figure 18:
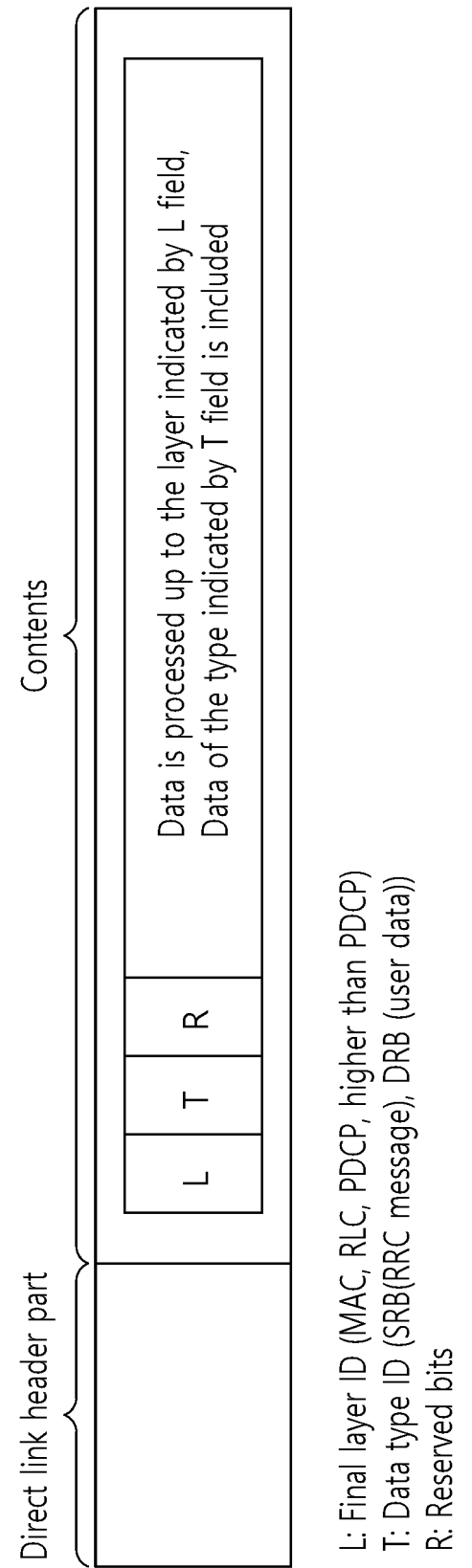
FIG. 18 illustrates an example of a protocol data unit (PDU) format available to be used in an inter-UE direct link.

FIG. 18 illustrates an example of a protocol data unit (PDU) format available to be used in an inter-UE direct link.

Referring to FIG. 18, the data forwarded through an inter-UE direct link may include a direct link header and contents. The contents part may include the information (field) indicating that the data is a PDU of a certain L2 sublayer and/or the information (field) indicating a type of the forwarded data. For example, the contents may include fields indicated by L and T. The field indicated by L is the information indicating that the data is a PDU of a certain L2 sublayer, and may indicate whether the data is a MAC PDU, a RLC PDU, a PDCP PDU or a PDU of PDCP higher layer (e.g., IP). The field indicated by T may include the information indicating a type of the data. The information may indicate whether the data is a data transmitted through an SRB/control data or a user data transmitted through a DRB. The R field may indicate whether the data includes a specific MAC CE or at least one MAC CE. Or, the R field may indicate whether the data includes a specific RLC control PDU or at least one RLC control PDU. Or, the R field may indicate whether the data includes a specific PDCP control PDU or at least one PDCP control PDU.

In order to work for the transmission of the first UE, the link converter of the second UE that receives the data from the first UE through the inter-UE direct link identifies that the received data is a PDU of a certain second sublayer, and determines to send the received data to the second sublayer based on it. For example, when the received data is a MAC PDU, this is sent to PHY, and when the received data is an RLC PDU, this is sent to MAC. In addition, when the received data is a PDCP PDU, this is sent to RLC, and when the received data is a PDU of PDCP higher layer, this is sent to PDCP. The link converter of the second UE may identify the T control field, and may determine through which radio bearer the received data is transmitted (in the case that the received data is a PDCP PDU) or through which logical channel the received data is transmitted (in the case that the received data is an RLC PDU), and so on. The network may indicate what PDU of layer/sublayer is transmitted to the first UE and the second UE in advance.

The link converter of the second UE a transmittable transport block in an aspect of MAC of the second UE aspect to the RLC sublayer of the second UE through the link converter of the first UE. Based on the information, the RLC sublayer of the second UE may perform a repartition of an RLC PDU.

Meanwhile, the ACK/NACK of an eNB for a data transmission of the first UE that the second UE works for may be forwarded to the first UE. For example, when the first UE generates an RLC PDU and transmits it to the second UE, and accordingly, the second UE transmits the data to the eNB and receives a RLC STATUS REPORT meaning an ACK for it, the second UE may notify that the RLC PDU transmission of the first UE is succeeded by transmitting an RLC control PDU meaning an ACK for the RLC PDU. For this, the link converter may setup a sequence number (SN) field to a value (i.e., an SN value of the ACK corresponding to an SN of the RLC PDU that the first UE transmits to the second UE) that the first UE is expected to receive. As another method of forwarding the ACK/NACK of the eNB for the data transmission of the first UE that the second UE works for the RLC STATUS PDU, when the second UE receives an RLC PDU from the first UE, the method is applicable that the second UE transmits an RLC control PDU meaning an ACK to the first UE first, and the second UE guarantees a successful transmission of the RLC PDU. In this paragraph, the example of the feedback (ACK/NACK) to the RLC layer is described, but the method may also be applied to the feedback in other layer like PDCP, MAC, and so on.

Using the R field, it may be indicated whether the data includes a specific MAC CE or at least one MAC CE. Similarly, using the R field, it may be indicated whether the data includes a specific RLC control PDU or at least one RLC control PDU. Similarly, using the R field, it may be indicated whether the data includes a specific PDCP control PDU or at least one PDCP control PDU. Using the R field, it may be indicated whether the MAC PDU includes the data (e.g., VoIP) for a real time service which is sensitive to latency or includes only the data (internet traffic) which is not sensitive to latency relatively, not including the data (e.g., VoIP) for a real time service which is sensitive to latency.

In the case that the inter-UE direct link is the direct communication link (sidelink) based on LTE, the L and T fields may be included in the MAC header of the Sidelink MAC PDU. In this case, the L field may be setup as a MAC PDU always.

Meanwhile, it is available that the first UE separately generates a MAC control element (CE) and transmits it to the second UE through the inter-UE direct link. The second UE that receives it transmits it to the eNB. When constructing a MAC PDU including the MAC CE, the second UE may indicate that the MAC CE is a MAC CE that other UE is going to transmit through a specific field of the header of the MAC PDU or introducing a new field, or through a specific field in the MAC CE part or introducing a new field. For example, the second UE may indicate that the MAC PDU includes an identifier of the first UE or the MAC CE is a MAC CE of other UE, that is, a MAC CE for proxy transmission.

The case will be described that the second UE works for a data reception of the first UE. 1) It is available to transmit an SDU processed up to a specific sublayer of the second UE to the first UE and to make the first UE perform a post process. 2) As another method, it is available that after the second UE constructs up to a PDCP SDU, the second UE transmits it to the first UE. Even in this case, the function of a data format or a link converter defined in the inter-UE direct link described above is applied. However, When the received data is a MAC SDU in the aspect of the first UE, the data is transmitted to an RLC, when the received data is an RLC SDU, the data is transmitted to a PDCP, and when the received data is a PDCP SDU, it is forwarded to a higher layer (e.g., IP layer). It may be indicated which method is to be used among the two methods by the network to the UE.

Reference to FIG. 16 again, a procedure (step, S1640) will be described for transmitting a signal received from the first UE to the second UE in FIG. 16.

In the case that the second UE that determines to perform the proxy operation receives the data to be transmitted from the first UE to the network, the second UE request an uplink transport resource for the data transmission to the eNB.

The second UE may perform the uplink resource request for the data transmission through a scheduling request (RS) resource which is dedicated to the first UE. For example, the second UE may transmit the scheduling request through a PUCCH configured for each UE according to the configuration of the eNB.

Alternatively, the second UE may perform the uplink resource request for the data transmission through a scheduling request resource which is dedicated to the second UE. For example, the second UE does not setup a separate PUCCH for each UE, but may transmit the scheduling request of the first UE through the PUCCH.

Or, the second UE may also perform the uplink resource request for the data transmission through a random access procedure. For example, the second UE may perform the scheduling request for being allocated with the uplink resource from the network through the random access procedure in order to work for the uplink transmission operation of the first UE. In this case, the second UE may perform a contention resolution using a UE ID of the first UE during the random access procedure. The eNB may allocate a separate random access preamble group for the proxy operation like the scheduling request transmission and the like described above. In this case, the second UE uses the separate random access preamble during the random access procedure for the proxy of the uplink transmission operation of the first UE. Through a configuration of a serving cell, the second UE may construct a PUCCH channel for itself and a PUCCH channel for the first UE separately, and may transmit by separately constructing scheduling request/HARQ feedback/CSI and the like for the second UE and scheduling request/HARQ feedback/CSI and the like for the first UE.

In order to work for a buffer status report of the first UE, the second UE may induce the buffer status report distinguished for each UE and transmit it.

In addition, the random access procedure may be operated in parallel by distinguishing it for each UE.

In the case that the second UE determines to perform the proxy operation, for example, in the case that the second UE determines to transmit the data that is going to be transmitted to the network by the first UE in place of the first UE, the second UE may receive the scheduling information for the data transmission of the first UE from the first UE, and may transmit the data that the first UE is going to transmit to the network through the uplink data channel which is determined based on the scheduling information. The uplink data channel may be a physical uplink shared channel (PUSCH).

In the case that the second UE works for the data transmission of the first UE, the second UE may work for the PHY, MAC, RLC and PDCP operations that are performed when the first UE is going to transmit data to the eNB. The second UE may transmit data using a required configuration among the PHY, MAC, RLC and PDCP of the first UE.

Alternatively, in the case that the second UE works for the data transmission of the first UE, the second UE may perform the proxy transmission operation and the PHY, MAC, RLC and PDCP operations according to it according to at least one configuration of PHY, MAC, RLC and PDCP that may be used when performing the proxy operation.

Meanwhile, the second UE may receive a BSR of the first UE for an uplink transmission from the first UE. The second UE may identify the BSR of the first UE as an uplink buffer status of a proxy radio bearer. The BSR may be forwarded to the eNB through a PUSCH.

The second UE may designate the proxy radio bearer as a separate logical channel group (LCG) according to the indication of the eNB, and may process the buffer status of the first UE to be the buffer status of the LCG.

Alternatively, the second UE may construct a proxy buffer status report MAC control element including the buffer status of the first UE. The proxy buffer status report may be processed by being distinguished from the existing BSR that includes the buffer status of the second UE only. In order to indicate to which UE the BSR is related, the second UE may include the a UE identifier in the BSR or may include the information indicating that it is the proxy operation buffer status report in the buffer status report MAC CE or the corresponding MAC header.

The eNB may allocate an uplink grant of the second UE as follows according to the scheduling request and the BSR received from the second UE.

The eNB may allocate an uplink grant without distinguishing the uplink grant for the uplink data of the first UE and the uplink grant for the uplink data of the second UE. In this case, in the uplink grant identified by an identifier (e.g., RNTI) of the second UE, both of the uplink grant for the uplink data of the first UE and the uplink grant for the uplink data of the second UE are included. The second UE monitors the RNTI of the second UE only.

Otherwise, the eNB may allocate an uplink grant by distinguishing the uplink grant for the uplink data of the first UE and the uplink grant for the uplink data of the second UE. In this case, the uplink grant identified by an identifier (e.g., RNTI) of the first UE is distinguished from the uplink grant identified by an identifier of the second UE. The second UE monitors both of the RNTI of the first UE and the RNTI of the second UE.

For the uplink transmission, the second UE may apply the priority as follows.

The BSR of the first UE has lower priority than the MAC control element (C-RNTI, BSR and PHR) and the uplink control channel data. Alternatively, the BSR of the first UE has the same priority as the BSR of the second UE.

The BSR of the first UE has higher priority than the data of the second UE.

The BSR of the first UE has higher priority than the padding BSR of the second UE.

The data of the first UE has a priority lower than or the same as the data of the second UE.

The data of the first UE has a priority higher than or the same as the data of the second UE.

Figure 19:
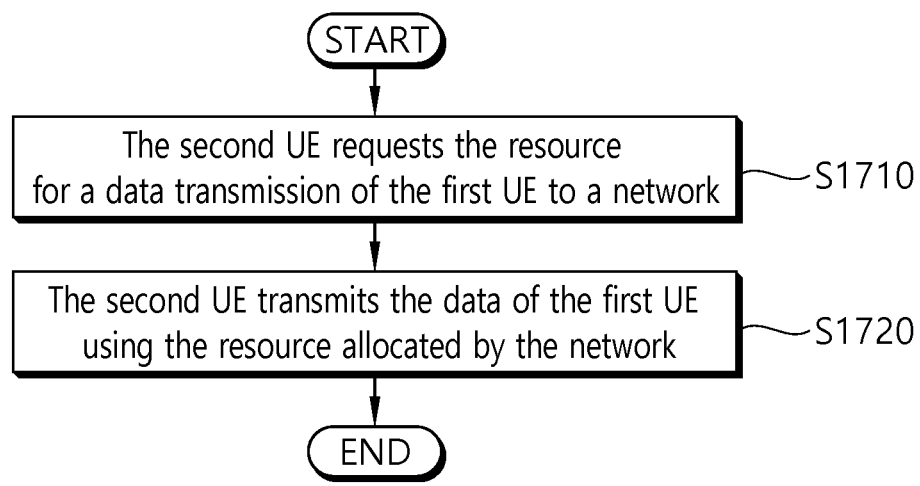
FIG. 19 illustrates an operation method for a proxy transmission of the second UE.

FIG. 19 illustrates an operation method for a proxy transmission of the second UE.

Referring to FIG. 19, the second UE requests the resource for a data transmission of the first UE in a network (step, S1710). The data of the first UE may be a user data induced from the first UE or a control data like a response to the RRC message received from the network, and so on.

The second UE transmits the data of the first UE in place of the first UE using the resource allocated by the network (step, S1720). After being allocated with the resource from the network in response to the response to the request, the second UE may transmit the data of the first UE using the allocated resource.

Figure 20:
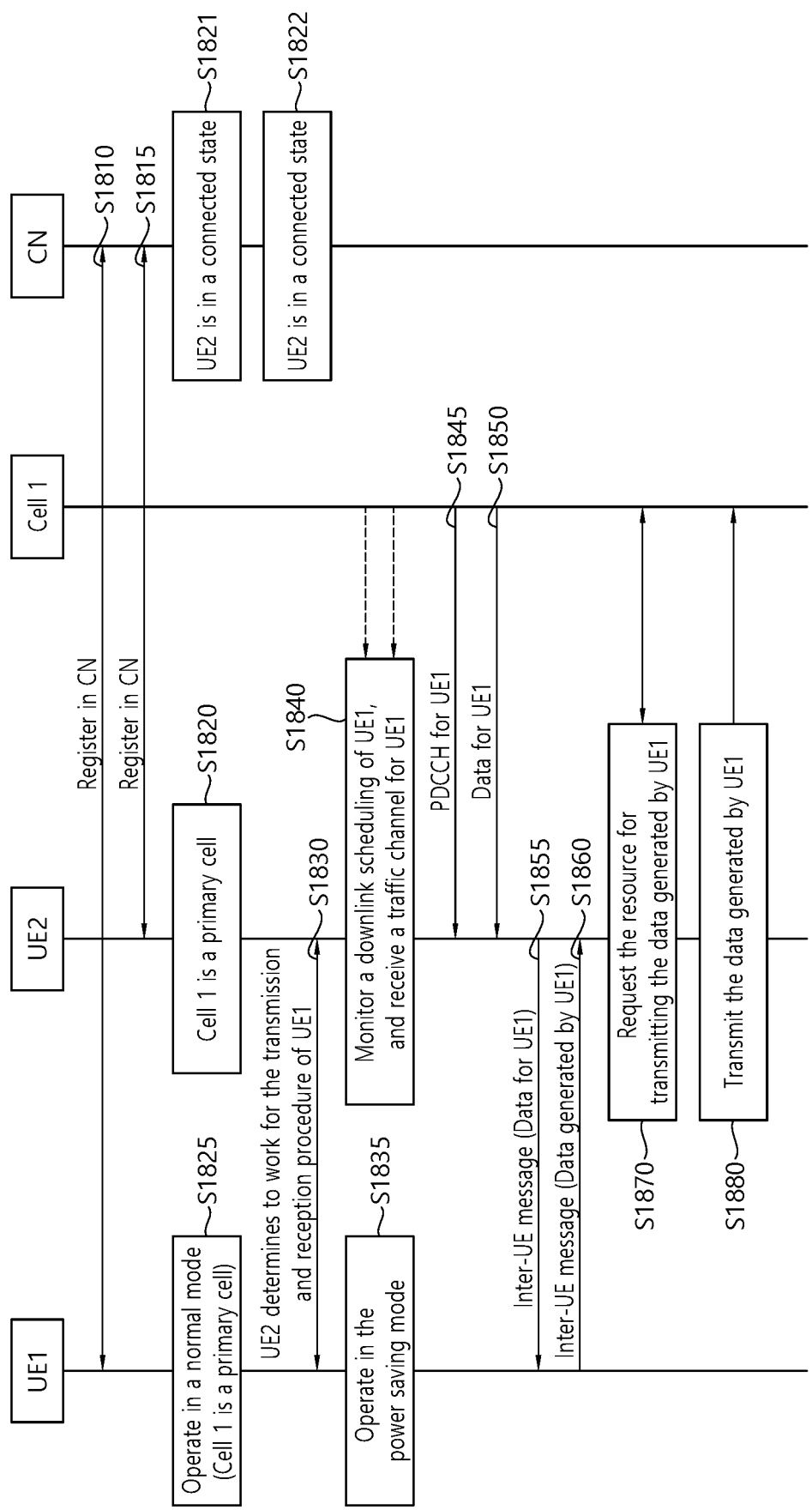
FIG. 20 illustrates an example of a method for performing a proxy operation of a UE.
Figure 21:
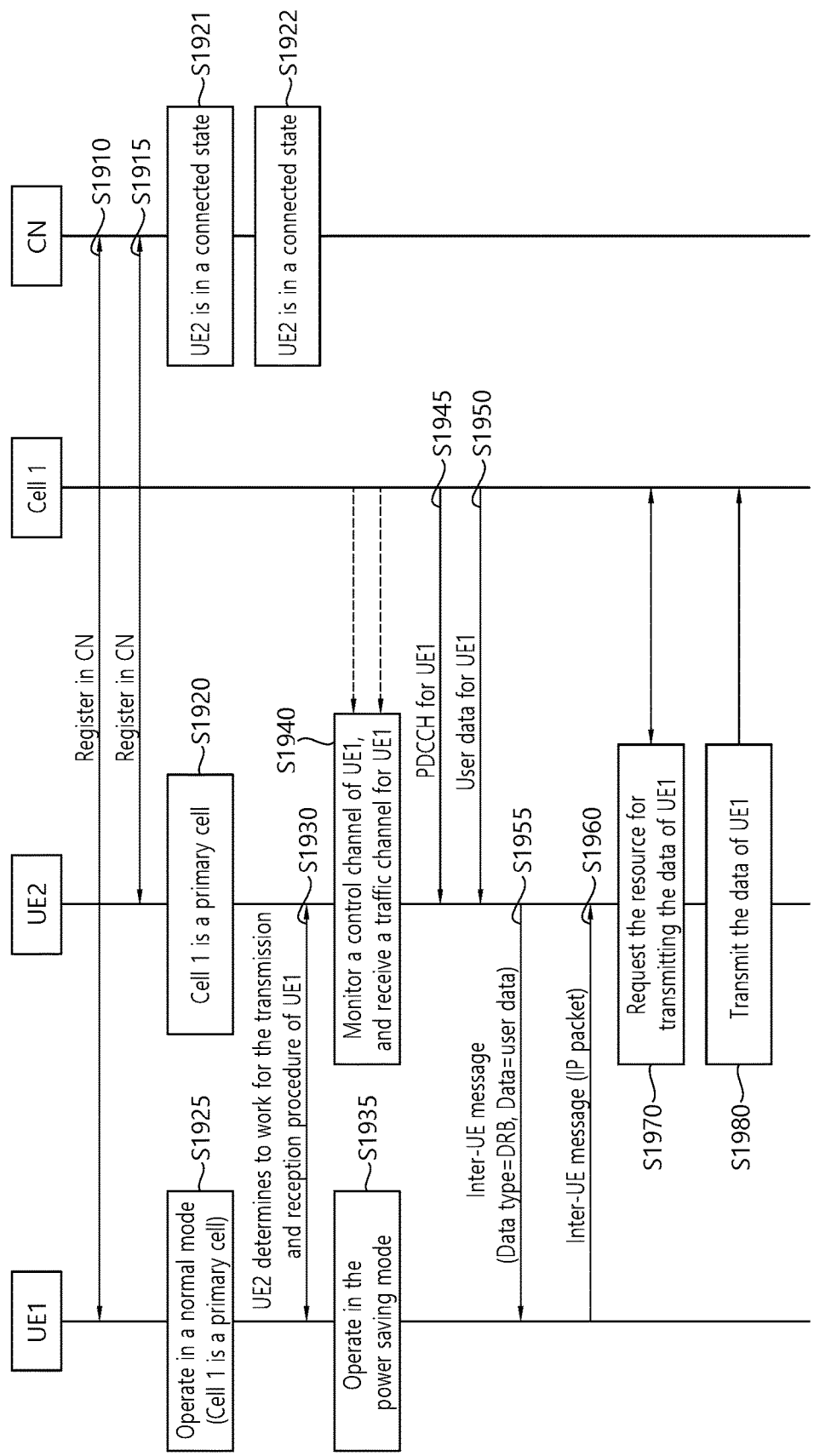
FIG. 21 illustrates an example of a method for performing a proxy operation of a UE.
Figure 22:
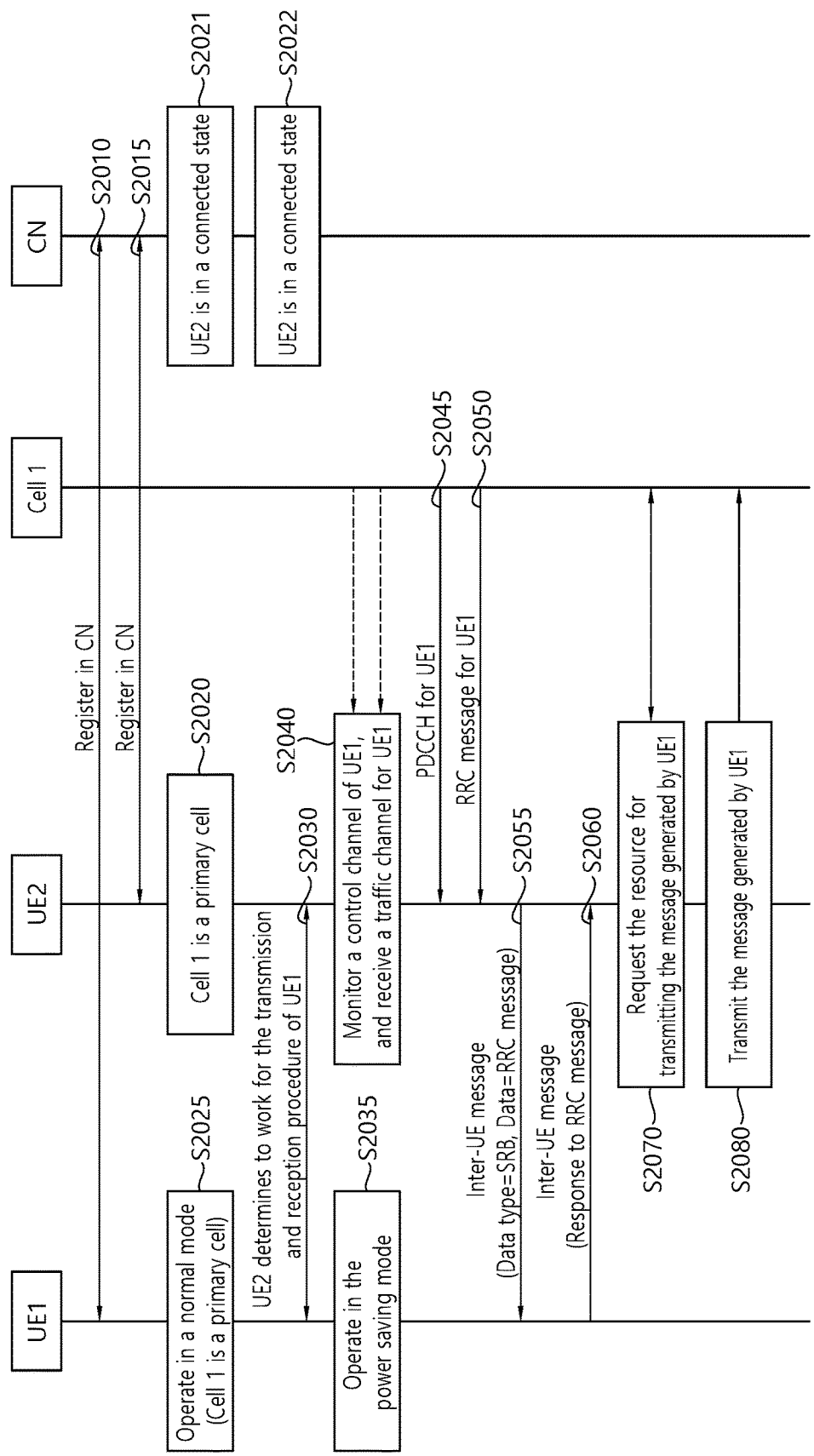
FIG. 22 illustrates an example of a method for performing a proxy operation of a UE.

FIGS. 20 to 22 illustrate particular examples to which the present invention is applied.

FIG. 20 illustrates an example of a method for performing a proxy operation of a UE.

Referring to FIG. 20, the first UE may register the information of the first UE in a CN (e.g., MME) (step, S1810), and the second UE may register the information of the second UE in a CN (step, S1815). In this case, a primary cell of the first UE and the second UE may be "cell 1", that is, the serving cell of the first UE and the second UE may be cell 1 (step, S1820). The second UE may be in a connected state with the CN (steps, S1821 and S1822).

The first UE may operate in a normal mode (step, S1825), and the particular example that the first UE operates in the normal mode is as described above.

Between the first UE and the second UE, the second UE may determine to work for the transmission and reception procedure of the first UE (step, S1830). In this case, the details of the determination of the transmission and reception procedure are as described above with reference to FIG. 13 to FIG. 15.

Later, the first UE operates in the power saving mode (step, S1835). In this case, the details of the power saving mode operation are as described above.

The second UE monitors a downlink scheduling of the first UE, and receives a traffic channel (data channel) for the first UE (step, S1840).

Particularly, the second UE monitors a PDCCH for the first UE (step, S1845), and receives data for the first UE (step, S1850).

The second UE may forward the data for the first UE to the first UE (step, S1860). That is, after the second UE receives the data of the UE worked by the second UE itself, that is, the data targeted to the first UE from the network instead of the first UE, the second UE forwards it to the first UE in the form of an inter-UE message.

The first UE forwards the data generated by the first UE to the second UE (step, S1860). The data generated by the first UE may be a user data generated in response to the 'data for the first UE' or control data.

The second UE requests the resource for transmitting the data generated by the first UE to cell 1 (step, S1870), and transmits the data generated by the first UE using the resource allocated in response to it (step, S1880).

While the second UE performs the proxy operation for the first UE, the radio resource required for performing the proxy operation of the first UE may collide with the radio resource required for performing an intrinsic operation of the second UE. For example, the transmission radio resource selected/scheduled for the proxy operation of the first UE may be overlapped with the radio resource selected/scheduled for the intrinsic operation of the second UE. In addition, owing to the lack of capability of a UE, the case may occur that the proxy operation (transmission/reception) of the first UE and the intrinsic operation (transmission/reception) of the second UE are unable to be performed simultaneously. In preparation for the case, a UE may determine a priority, and may determine the operation which is preferentially processed when the case occurs. For example, the second UE may determine to process the operation of the second UE preferentially when the case occurs. Otherwise, a UE may be instructed by a network in advance the operation which is preferentially processed. In the case that the second UE receives the data sensitive to latency from the first UE, the second UE may perform an exceptional operation that the data of the first UE, sensitive to latency, preferentially, by increasing the priority for processing the data received from the first UE to be higher than the priority of processing the intrinsic operation of the second UE. It may be determined that the second UE is to perform a delayed process for the operation that is not performed since the priority is low. In the case that the second UE receives the data sensitive to latency from the first UE for the proxy transmission but fails to perform the proxy transmission, the second UE may discard the data.

FIG. 21 illustrates an example of a method for performing a proxy operation of a UE.

Referring to FIG. 21, the first UE may register the information of the first UE in a CN (e.g., MME) (step, S1910), and the second UE may register the information of the second UE in a CN (step, S1915). In this case, a primary cell of the first UE and the second UE may be "cell 1", that is, the serving cell of the first UE and the second UE may be cell 1 (step, S1920). The second UE may be in a connected state with the CN (steps, S1921 and S1922).

The first UE may operate in a normal mode (step, S1925), and the particular example that the first UE operates in the normal mode is as described above.

Between the first UE and the second UE, the second UE may determine to work for the transmission and reception procedure of the first UE (step, S1930). In this case, the details of the determination of the transmission and reception procedure are as described above with reference to FIG. 13 to FIG. 15.

Later, the first UE operates in the power saving mode (step, S1935). In this case, the details of the power saving mode operation are as described above.

The second UE monitors a control channel of the first UE, and receives a traffic channel (data channel) for the first UE (step, S1940).

Particularly, the second UE may receive a PDCCH for the first UE (step, S1945), and receive a user data for the first UE (step, S1950).

The second UE may forward the user data for the first UE with an inter-UE message to the first UE (step, S1955). In this case, the second UE may notify that the type of the data included in the inter-UE message is a user data provided through a DRB. That is, after the second UE receives the data of the UE worked by the second UE itself, that is, the user data targeted to the first UE from the network instead of the first UE, the second UE forwards it to the first UE in the form of an inter-UE message. In this case, the information representing that the data type is a user data provided through a DRB may also be provided to the first UE.

The first UE forwards the data (e.g., IP packet) generated by the first UE to the second UE (step, S1960).

The second UE requests the resource for transmitting the data generated by the first UE to cell 1 (step, S1970), and transmits the data generated by the first UE using the resource allocated in response to it to cell 1 (step, S1980).

FIG. 22 illustrates an example of a method for performing a proxy operation of a UE.

Referring to FIG. 22, the first UE may register the information of the first UE in a CN (e.g., MME) (step, S2010), and the second UE may register the information of the second UE in a CN (step, S2015). In this case, a primary cell of the first UE and the second UE may be "cell 1", that is, the serving cell of the first UE and the second UE may be cell 1 (step, S2020). The second UE may be in a connected state with the CN (steps, S2021 and S2022).

The first UE may operate in a normal mode (step, S2025), and the particular example that the first UE operates in the normal mode is as described above.

Between the first UE and the second UE, the second UE may determine to work for the transmission and reception procedure of the first UE (step, S2030). In this case, the details of the determination of the transmission and reception procedure are as described above with reference to FIG. 13 to FIG. 15.

Later, the first UE operates in the power saving mode (step, S2035). In this case, the details of the power saving mode operation are as described above.

The second UE monitors a control channel of the first UE, and receives a traffic channel (data channel) for the first UE (step, S2040).

Particularly, the second UE may receive a PDCCH for the first UE (step, S2045), and receive an RRC message for the first UE (step, S2050).

The second UE may forward the RRC message for the first UE with an inter-UE message to the first UE (step, S2055). In this case, the second UE may notify that the type of the data included in the inter-UE message is control data (e.g., RRC message) provided through an SRB. That is, after the second UE receives the data of the UE worked by the second UE itself, that is, the RRC message targeted to the first UE from the network instead of the first UE, the second UE forwards it to the first UE in the form of an inter-UE message. In this case, the information representing that the data type is control data like the RRC message provided through an SRB may also be provided to the first UE.

The first UE forwards the data (e.g., a response to the RRC message) generated by the first UE to the second UE (step, S2060).

The second UE requests the resource for transmitting the data generated by the first UE to cell 1 (step, S2070), and transmits the data generated by the first UE using the resource allocated in response to it to cell 1 (step, S1980).

Figure 23:
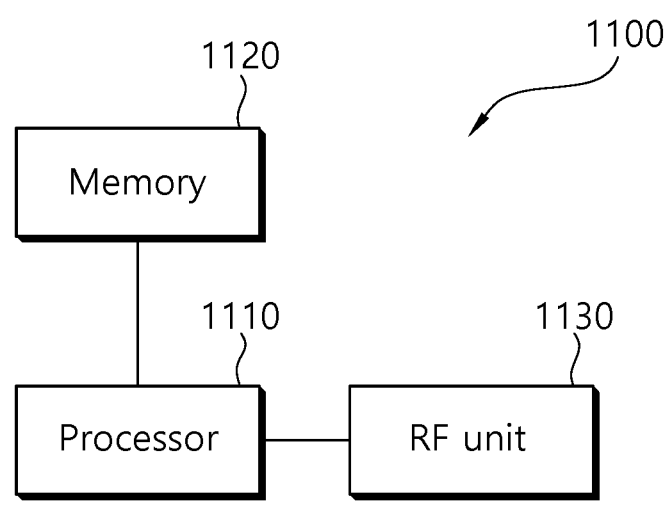
FIG. 23 is a block diagram illustrating a UE in which embodiments of the present invention are implemented.

FIG. 23 is a block diagram illustrating a UE in which the embodiments of the present invention are implemented.

Referring to FIG. 23, a UE 1100 includes a processor 1110, a memory 1120 and a radio frequency (RF) unit 1140. The processor 1110 implements the proposed functions, processes and/or methods.

The RF unit 1140 is connected with the processor 1110, and transmits and receives radio signals.

The processor may include an application-specific integrated circuit (ASIC), a separate chipset, a logic circuit, and/or a data processing unit. The memory may include a read-only memory (ROM), a random access memory (RAM), a flash memory, a memory card, storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

What is claimed is:

1. A method for performing a communication operation of a first user equipment (UE) in a wireless communication system, the method performed by a second UE and comprising:
    determining to perform the communication operation for transmission and reception of a signal of the first UE, when both residual battery capacity and processing capability of the second UE are better than both residual battery capacity and processing capability of the first UE;
    receiving, from the first UE, a UE configuration of the first UE; and
    performing the transmission and reception of the signal of the first UE based on the UE configuration of the first UE,
    wherein when the second UE performs the transmission of the signal of the first UE, the second UE performs an uplink resource request operation using a scheduling request resource which is dedicated to the first UE, and when the second UE performs the reception of the signal of the first UE, the second UE performs a monitoring operation for the first UE-specific search space,
    wherein the signal of the first UE is related to data of cellular communication, and
    wherein the second UE preferentially performs a communication operation of the second UE when a first resource for performing the communication operation of the first UE and a second resource for performing the communication operation of the second UE overlap each other.

2. The method of claim 1, wherein a network transmits control information to the first UE, and the control information is identified by an identifier of the first UE.

3. The method of claim 1, wherein a network transmits control information to the first UE, and the control information is identified by an identifier of the second UE.

4. The method of claim 3, wherein the control information that the network transmits to the first UE includes a field representing that the control information is with respect to the first UE.

5. The method of claim 1, wherein when the second UE receives data that a network transmits to the first UE, the second UE forwards the data to the first UE.

6. The method of claim 5, wherein the second UE forwards the data to the first UE, using a sidelink operation.

7. The method of claim 1, wherein when the second UE determines to perform the communication operation for the transmission and reception of the signal of the first UE the second UE transmits proxy operation information to a network, and the network transmits the proxy operation information to the first UE.

8. The method of claim 7, wherein the second UE transmits an uplink data of the first UE using an uplink resource that the network allocates to the first UE.

9. The method of claim 1, wherein when the second UE determines to perform the communication operation for the transmission and reception of the signal of the first UE, the first UE operates in a power saving mode.

10. The method of claim 9, wherein the first UE in the power saving mode performs one of:
    not performing a measurement of a serving cell and a neighboring cell which is required for performing a procedure in relation to mobility, performing a measurement of a serving cell and a neighboring cell which is required for performing a procedure in relation to mobility with a lower frequency than the second UE, omitting a paging reception, or performing a paging reception with a lower frequency than the second UE.

11. The method of claim 1, wherein the second UE receives configuration information of the first UE from the first UE, and performs the communication for the transmission and reception of the signal of the first UE.

12. The method of claim 1, wherein the second UE transmits proxy request information to the first UE before determining to perform the communication operation for transmission and reception of the signal of the first UE.

13. The method of claim 12, wherein the second UE receives proxy response information from the first UE in response of the proxy request information, and
    wherein the proxy response information informs the UE configuration of the first UE.

14. The method of claim 12, wherein the proxy request information includes a service code related to the signal of the first UE transmitted and received by the second UE.

15. The method of claim 1, wherein both of the first UE and the second UE provide a communication service for a same user.

16. A first user equipment (UE), comprising:
    a transceiver configured to transmit or receive a radio signal; and
    a processor operatively connected to the transceiver,
    wherein the processor is configured to:
    determine to perform the communication operation for transmission and reception of a signal of a second UE, when both residual battery capacity and processing capability of a first UE are better than both residual battery capacity and processing capability of the second UE;
    receive, from the second UE, a UE configuration of the second UE; and
    perform the transmission and reception of the signal of the second UE based on the UE configuration of the second UE,
    wherein when the first UE performs the transmission of the signal of the second UE, the first UE performs an uplink resource request operation using a scheduling request resource which is dedicated to the second UE, and when the first UE performs the reception of the signal of the second UE, the first UE performs a monitoring operation for the second UE-specific search space, wherein the signal of the second UE is related to data of cellular communication, and wherein the first UE preferentially performs a communication operation of the first UE when a first resource for performing the communication operation of the first UE and a second resource for performing the communication operation of the second UE overlap each other.

* * * * *